US012163493B2

(12) United States Patent
Ishihara et al.

(10) Patent No.: US 12,163,493 B2
(45) Date of Patent: Dec. 10, 2024

(54) MALFUNCTION DIAGNOSIS DEVICE FOR LEAKAGE DIAGNOSIS DEVICE

(71) Applicant: DENSO CORPORATION, Kariya (JP)

(72) Inventors: Keiichirou Ishihara, Kariya (JP); Taiki Yasuzaka, Kariya (JP); Tomohiro Itoh, Kariya (JP); Yasuo Kato, Kariya (JP)

(73) Assignee: DENSO CORPORATION, Kariya (JP)

( * ) Notice: Subject to any disclaimer, the term of this patent is extended or adjusted under 35 U.S.C. 154(b) by 34 days.

(21) Appl. No.: 18/191,749

(22) Filed: Mar. 28, 2023

(65) Prior Publication Data

US 2023/0243320 A1 Aug. 3, 2023

Related U.S. Application Data

(63) Continuation of application No. PCT/JP2021/034023, filed on Sep. 16, 2021.

(30) Foreign Application Priority Data

Sep. 30, 2020 (JP) ................................. 2020-165591

(51) Int. Cl.
*F02M 25/00* (2006.01)
*F02M 25/08* (2006.01)

(52) U.S. Cl.
CPC .... *F02M 25/0818* (2013.01); *F02M 25/0836* (2013.01)

(58) Field of Classification Search
CPC ........... F02M 25/0818; F02M 25/0836; F02M 25/0809; F02M 25/089; F02M 25/08; F02D 41/22; F02D 45/00; Y02T 10/40
See application file for complete search history.

(56) References Cited

U.S. PATENT DOCUMENTS

| | | | | |
|---|---|---|---|---|
| 2005/0044939 A1* | 3/2005 | Kobayashi | ......... | F02M 25/0818 73/114.39 |
| 2007/0051168 A1* | 3/2007 | Kato | .................. | F02M 25/0809 73/49.7 |
| 2007/0137622 A1* | 6/2007 | Koyama | ............ | F02M 25/0809 123/520 |

(Continued)

FOREIGN PATENT DOCUMENTS

JP 2002-357164 12/2002

*Primary Examiner* — Phutthiwat Wongwian
*Assistant Examiner* — Sherman D Manley
(74) *Attorney, Agent, or Firm* — Nixon & Vanderhye P.C.

(57) ABSTRACT

A leakage diagnosis device for an evaporative fuel treatment device includes a first vent valve, a second vent valve, and a pump. The first vent valve is configured to block a first atmospheric passage, which is a main passage of an atmospheric passage and connects a canister with an atmospheric opening. The second vent valve is configured to block a second atmospheric passage, which is a bypass passage of the first atmospheric passage and connects the canister with the atmospheric opening. The pump is provided on a side of the atmospheric opening relative to the second vent valve in the second atmospheric passage, and is configured to pressurize or depressurize the second atmospheric passage. A malfunction diagnosis device performs a malfunction diagnosis based on an output value of a pressure sensor, a current value of the pump, or an output value of an air-fuel ratio sensor.

5 Claims, 29 Drawing Sheets

(56) References Cited

U.S. PATENT DOCUMENTS

| | | | |
|---|---|---|---|
| 2015/0361929 A1* | 12/2015 | Tamura | F02M 25/0809 |
| | | | 73/114.39 |
| 2016/0108864 A1* | 4/2016 | Tochihara | F02M 25/0809 |
| | | | 123/519 |
| 2017/0167415 A1* | 6/2017 | Tochihara | F02D 41/0042 |
| 2018/0274491 A1 | 9/2018 | Uematsu et al. | |
| 2018/0274492 A1 | 9/2018 | Uchida | |
| 2019/0368447 A1* | 12/2019 | Steinman | F02M 25/0818 |
| 2022/0099051 A1* | 3/2022 | Ishihara | F02M 25/0836 |

* cited by examiner

FIRST EMBODIMENT

FIRST EMBODIMENT

SECOND EMBODIMENT

MALFUNCTION DIAGNOSIS DEVICE FOR LEAKAGE DIAGNOSIS DEVICE

CROSS REFERENCE TO RELATED APPLICATIONS

This application is a continuation application of International Patent Application No. PCT/JP2021/034023 filed on Sep. 16, 2021, which designated the U.S. and based on and claims the benefits of priority of Japanese Patent Application No. 2020-165591 filed on Sep. 30, 2020. The entire disclosure of all of the above applications is incorporated herein by reference.

TECHNICAL FIELD

The present disclosure relates to a malfunction diagnosis device for a leakage diagnosis device.

BACKGROUND

Conventionally, a device for diagnosing leakage of a member, a pipe, and the like in an evaporative fuel treatment device that collects evaporative fuel from a fuel tank and supplies the evaporative fuel to an intake passage.

SUMMARY

A malfunction diagnosis device is configured to diagnose a malfunction of a leakage diagnosis device for an evaporative fuel treatment device.

The present disclosure relates to a malfunction diagnosis device configured to perform malfunction diagnosis of a leakage diagnosis device, which is provided to an atmospheric passage in an evaporative fuel treatment device, to diagnose leakage of evaporative fuel. The evaporative fuel treatment device purges the evaporative fuel adsorbed on a canister into an intake passage through a purge passage. The canister is connected to a fuel tank through a vapor passage and is connected to an atmospheric opening through an atmospheric passage.

BRIEF DESCRIPTION OF DRAWINGS

The above and other objects, features and advantages of the present disclosure will become more apparent from the following detailed description made with reference to the accompanying drawings.

In the drawings.

DETAILED DESCRIPTION

Figure 1:
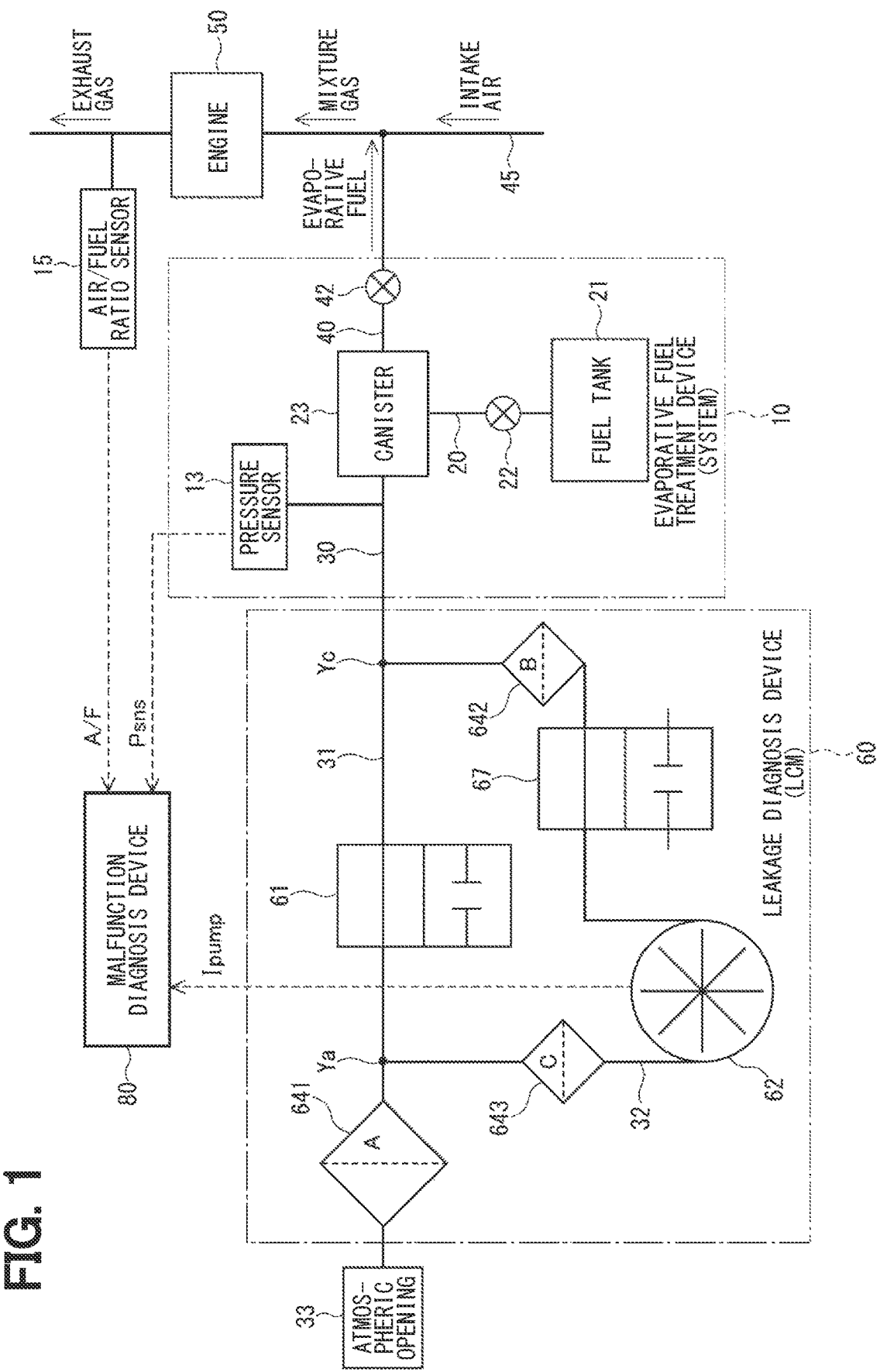
FIG. 1 is an overall configuration diagram of an evaporative fuel treatment device and a leakage diagnosis device.

In an assumable example, a device for diagnosing leakage of a member, a pipe, and the like in an evaporative fuel treatment device that collects evaporative fuel from a fuel tank and supplies the evaporative fuel to an intake passage. For example, a leakage diagnosis device for an evaporative fuel treatment device includes a CVV (canister vent valve), a CVV check valve, and a pump. The CVV is provided in a first flow path between a canister and the atmosphere. The CVV check valve and the pump are provided in a second flow path formed in parallel with the first flow path.

In the device according to the example, in a case where the leakage diagnosis device fails and where a determination result of "leakage occurrence" is made in a leakage diagnosis, the device is incapable of determining whether the determination result is due to leakage in the evaporative fuel treatment device or due to a malfunction of the leakage diagnosis device.

A malfunction diagnosis device is configured to diagnose a malfunction of a leakage diagnosis device for an evaporative fuel treatment device.

The present disclosure relates to a malfunction diagnosis device configured to perform malfunction diagnosis of a leakage diagnosis device, which is provided to an atmospheric passage in an evaporative fuel treatment device, to diagnose leakage of evaporative fuel. The evaporative fuel treatment device purges the evaporative fuel adsorbed on a canister into an intake passage through a purge passage. The canister is connected to a fuel tank through a vapor passage and is connected to an atmospheric opening through an atmospheric passage.

The leakage diagnosis device includes a first vent valve, a second vent valve, and a pump. The first vent valve corresponds to the CVV. The second vent valve and pump correspond to the CVV check valve and the pump.

The first vent valve is configured to block a first atmospheric passage, which is a main passage of the atmospheric passage and connects the canister with the atmospheric opening. The second vent valve is configured to block a second atmospheric passage, which is a bypass passage of the first atmospheric passage and connects the canister with the atmospheric opening. The pump is provided on a side of the atmospheric opening relative to the second vent valve in the second atmospheric passage, and is configured to pressurize or depressurize the second atmospheric passage.

The malfunction diagnosis device according to a first aspect of the present disclosure is configured to diagnose malfunction in the malfunction diagnosis based on an output value of a pressure sensor that is configured to detect pressure in a passage connected to the canister.

The malfunction diagnosis device according to a second aspect of the present disclosure diagnoses a malfunction in the malfunction diagnosis based on a current value of the pump.

The malfunction diagnosis device according to a third aspect of the present disclosure diagnoses malfunction in the malfunction diagnosis based on an output value of an air-fuel ratio sensor in a state where a purge valve, which is provided to a purge passage, is opened to purge evaporative fuel from the canister to the intake passage. The air-fuel ratio sensor detects the air-fuel ratio of air-fuel mixture supplied to the engine through the intake passage.

As described above, in the present disclosure, the leak diagnosis of the evaporative fuel treatment device can be performed in consideration of malfunction of the leakage diagnosis device.

Hereinafter, multiple embodiments of a malfunction diagnosis device according to the present disclosure will be described with reference to the drawings. This malfunction diagnosis device performs a malfunction diagnosis on a leakage diagnosis device that performs a leakage diagnosis on a fuel vapor treatment device for a vehicle. The fuel vapor treatment device collects fuel evaporative from a fuel tank with a canister and supplies the collected vapor to an intake passage. Hereinafter, the evaporative fuel treatment device is also referred to as a "system". The leakage diagnosis device is also referred to as a "leak check module (LCM)". (Overall Configuration of Evaporative Fuel Treatment Device and Leakage Diagnosis Device)

First, the overall configuration of the device will be described with reference to FIG. 1. The system, that is, an evaporative fuel treatment device 10 includes a fuel tank 21, a vapor passage 20, a canister 23, an atmospheric passage 30, a purge passage 40, and the like.

The fuel tank 21 in which the fuel is stored is connected to the canister 23 through the vapor passage 20. The canister 23 adsorbs evaporative fuel. Further, in the example of FIG. 1, a sealing valve 22 is provided to the vapor passage 20. Generally, the sealing valve 22 shuts off the fuel tank 21 from the canister 23 so that the fuel tank 21 is sealed, except when the vehicle is refueled. It is noted that, the sealing valve 22 may not be provided.

An atmospheric passage 30 connects the canister 23 with an atmospheric opening 33. The purge passage 40 connects the canister 23 with an intake passage 45. A purge valve 42 is provided in a midway portion of a purge passage 40. In a state where the purge valve 42 is open, evaporative fuel adsorbed in the canister 23 is purged to the intake passage 45, together with air introduced through the atmospheric passage 30, through the purge passage 40.

In this way, the evaporative fuel treatment device 10 purges the evaporative fuel adsorbed in the canister 23 into the intake passage 45 through the purge passage 40. At this time, an amount of evaporative fuel to be purged is adjusted according to an opening degree of the purge valve 42. Air-fuel mixture in which intake air and the evaporative fuel are mixed in the intake passage 45 is supplied to an engine 50.

The leakage diagnosis device 60 is provided to the atmospheric passage 30 to diagnose leak of the evaporative fuel in the evaporative fuel treatment device 10. In the leakage diagnosis device 60, two passages constituting the atmospheric passage 30 are formed in parallel. The first atmospheric passage 31, as a main passage of the atmospheric passage 30, connects the canister 23 with the atmospheric opening 33. The second atmospheric passage 32, as a bypass passage of the first atmospheric passage 31, connects the canister 23 with the atmospheric opening 33. Of confluence points between the first atmospheric passage 31 and the second atmospheric passage 32, a confluence point on the side of the canister 23 is referred to as Yc, and a confluence point on the side of the atmospheric opening 33 is referred to as Ya.

The leakage diagnosis device 60 includes a first vent valve 61, a second vent valve 67, a pump 62, and filters 641, 642, and 643. The first vent valve 61 is configured to shut off the first atmospheric passage 31. The second vent valve 67 is configured to shut off the second atmospheric passage 32. The first vent valve 61 and the second vent valve 67 of the present embodiment are composed of normally open solenoid valves.

The pump 62 is provided on a side of the atmospheric opening 33 relative to the second vent valve 67 in the second atmospheric passage 32, and is an electric pump driven by electric power. The pump 62 of the present embodiment is a decompression pump capable of decompressing the second atmospheric passage 32 to the negative pressure side with respect to the atmospheric pressure during operation. As described in other embodiments, a pressure pump capable of pressurizing the second atmospheric passage 32 to the positive pressure side with respect to the atmospheric pressure may be used.

The filter A 641 is provided in the atmospheric passage 30 between a confluence point Ya on the side of the atmospheric opening 33 in the leakage diagnosis device 60 and the atmospheric opening 33. The filter B 642 is provided in the second atmospheric passage 32 between the second vent valve 67 and a confluence point Yc on the side of the canister 23, and the filter C 643 is provided in the second atmospheric passage 32 between the pump 62 and the confluence point Ya on the side of the atmospheric opening 33.

Further, as a sensor normally used for the leakage diagnosis by the leakage diagnosis device 60, a pressure sensor 13 is provided for detecting the pressure in the passage connected to the canister 23. In the example of FIG. 1, the pressure sensor 13 is provided in the atmospheric passage 30 between the confluence point Yc on the side of the canister 23 and the canister 23. In addition or alternatively, for example, the pressure sensor 13 may be provided in the first atmospheric passage 31 between the confluence point Yc and the first vent valve 61 and/or may be provided in the second atmospheric passage 32 between the confluence point Yc and the filter B 642. In addition or alternatively, the pressure sensor 13 may be provided in the vapor passage 20 between the sealing valve 22 and the canister 23.

Further, an air-fuel ratio sensor (lambda sensor) 15 is provided on the side of the exhaust of the engine 50 for detecting an air-fuel ratio of the air-fuel mixture supplied to the engine 50 through the intake passage 45 generally for engine control.

Figure 2:
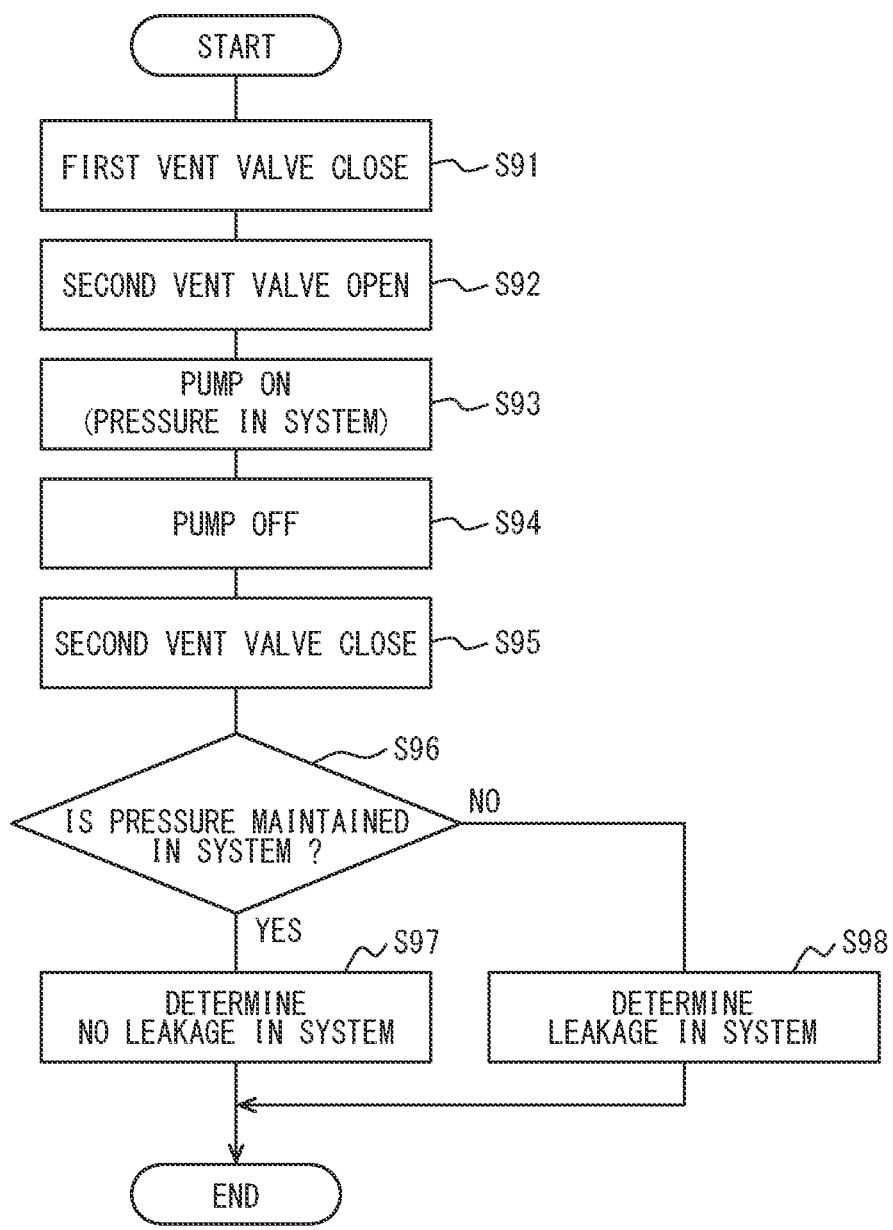
FIG. 2 is a flowchart showing a leak diagnosis of a comparative example.
Figure 3:
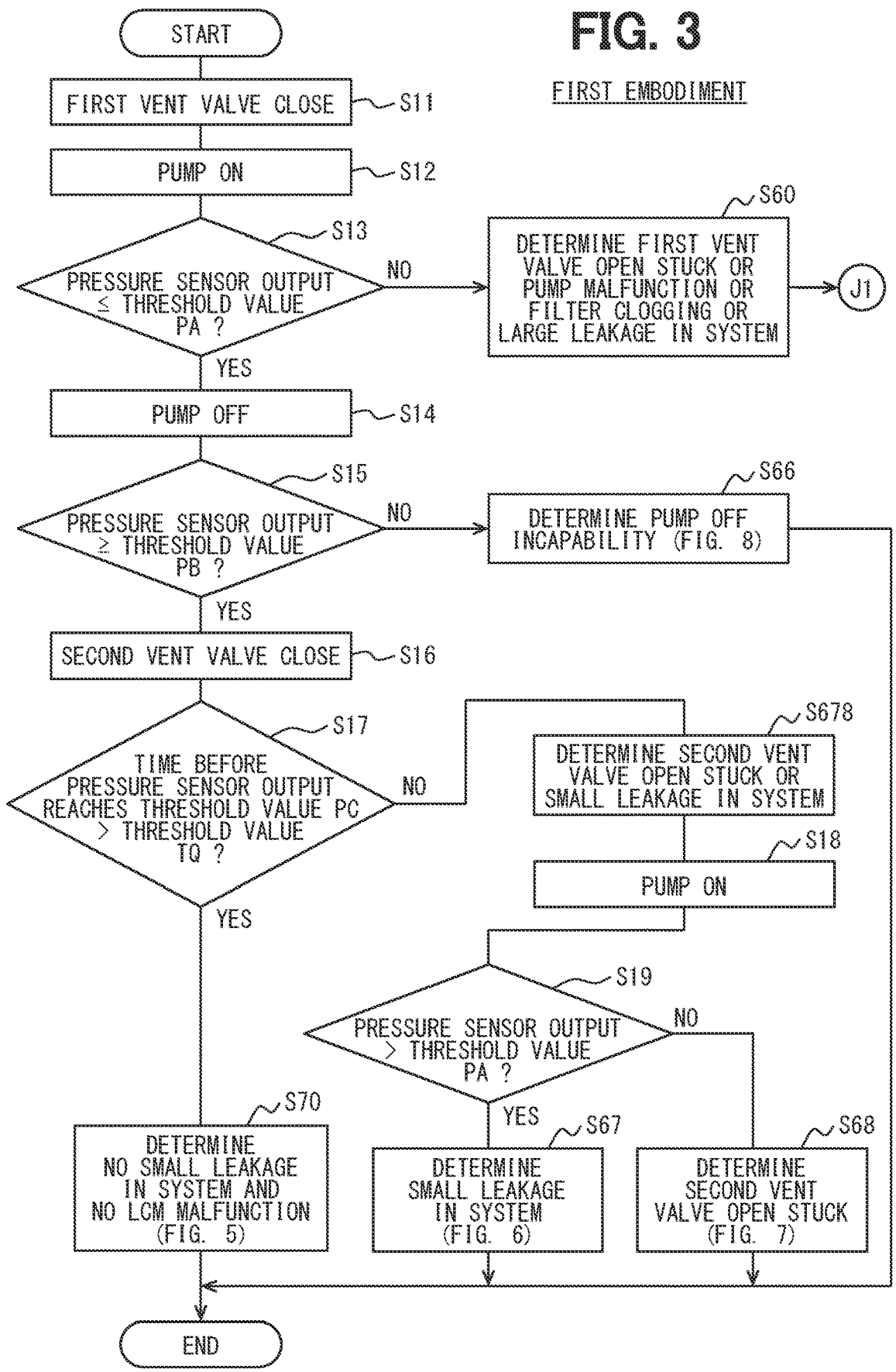
FIG. 3 is a flowchart showing a malfunction diagnosis implemented by a malfunction diagnosis device of a first embodiment.

The evaporative fuel treatment device 10 has such a configuration. The leak diagnosis method according to a comparative example is shown in the flowchart of FIG. 2. Hereinafter, in the description of the flowchart, a symbol "S" indicates a step. At the start of FIG. 2, the purge valve 42 is closed.

In S91, the first vent valve 61 corresponding to the CVV is closed. In S92, the second vent valve 67 corresponding to the CVV check valve is opened. After the pump 62 is turned on in S93 and pressure is generated in the system, the pump 62 is turned off in S94. The second vent valve 67 is closed in S95. In S96, it is determined whether the pressure in the system monitored at this time is maintained. When the pressure is maintained and determination of YES is made in S96, it is determined that "there is no leakage in the system" in S97. When the pressure is not maintained and determination of NO is made in S96, it is determined that "there is a leak in the system" in S98.

However, the comparative example assumes that the leakage diagnosis device 60 is not out of order. In other words, the comparative example does not consider the possibility of malfunction of each element of the leakage diagnosis device 60. Therefore, in the device according to the comparative example, in a case where the leakage diagnosis device 60 fails and where a determination result of "leakage occurrence" is made in a leak diagnosis, the device is incapable of determining whether the determination result is due to leakage in the evaporative fuel treatment device 10 or due to a malfunction of the leakage diagnosis device 60. In order to solve this problem, the malfunction diagnosis device 80 of the present embodiment enables diagnosis of the malfunction of the leakage diagnosis device 60.

The malfunction diagnosis device 80 of this embodiment performs the malfunction diagnosis of the leakage diagnosis device 60 based on one or more parameters of (1) the output value Psns of the pressure sensor 13, (2) the current value Ipump of the pump 62, and (3) the output value A/F of the air-fuel ratio sensor 15. Hereinafter, the output value Psns of the pressure sensor 13 is referred to as "pressure sensor output value Psns", the current value Ipump of the pump 62 is referred to as "pump current Ipump", and the output value A/F of the air-fuel ratio sensor 15 is referred to as "air-fuel ratio sensor output value A/F".

Specifically, in a first embodiment, the malfunction diagnosis is performed based on the pressure sensor output value Psns. In a second embodiment, the malfunction diagnosis is performed based on the pressure sensor output value Psns and the pump current Ipump. In a third embodiment, the malfunction diagnosis is performed based on the air-fuel ratio sensor output value A/F. As shown by the dashed arrow in FIG. 1, the malfunction diagnosis device 80 need not to regularly acquire the three parameters, and only the parameter(s) to be used may be acquired according to each of the embodiments.

(Malfunction Diagnosis for Leakage Diagnosis Device)

Next, the malfunction diagnosis of the leakage diagnosis device 60 by using the malfunction diagnosis device 80 will be described for each embodiment based on the flowchart and the time chart. In the first embodiment and the second embodiment, a part of the flowchart is shared, and substantially the same steps are assigned with the same step numbers, respectively. Further, the flowcharts of the first embodiment and the second embodiment are represented over two drawings via the connection symbols J1 and J2, respectively. Some step numbers of the determination steps in the 60s correspond to codes of the failed components.

The malfunction diagnosis is performed while the vehicle is parked, for example, after elapse of several hours subsequent to turn off of the ignition. In the first embodiment and the second embodiment, the leakage diagnosis of the system itself is performed at the same time as the malfunction diagnosis of the leakage diagnosis device 60 ("LCM" in the figure). As a rough indication, a "large leakage" of the system represents leakage that is equal to or higher than the flow rate when the vent valve 61 is opened and is assumed when the valve is not closed or when the pipe connection is disconnected. On the other hand, a "small leakage" represents a minute leakage due to a pinhole or the like.

Each time chart shows ON/OFF of the purge valve 42, the first vent valve 61, the second vent valve 67, and the pump 62 in common. For the normally closed purge valve 42, ON indicates open, and OFF indicates close. For the normally open first vent valve 61 and second vent valve 67, ON indicates close and OFF indicates open. In the first and second embodiments, the purge valve 42 is always closed.

Further, the time chart of the first embodiment shows the pressure sensor output value Psns, and some of the time charts further show the system temperature, that is, the ambient temperature of the leakage diagnosis device 60. Herein, a case where the system temperature increases with respect to the initial temperature is shown. The time chart of the second embodiment shows the pump current Ipump and the pressure sensor output value Psns. Since this embodiment assumes the decompression pump 62, when the pump 62 operates normally, the pressure sensor output value Psns changes from the atmospheric pressure to the negative side. The time chart of the third embodiment shows the air-fuel ratio sensor output value A/F.

Hereinafter, the flow chart and the time chart will be described with reference to each other. The numbers of drawings in parentheses in the steps of the flowchart indicate the numbers of drawings of the corresponding time charts, respectively. The malfunction diagnosis device 80 is the subject that turns ON/OFF the pump 62 and the vent valves 61 and 67 in each step. However, if the subject is described each time, such as "the malfunction diagnosis device 80 turns on the pump 62", it becomes redundant. Therefore, basically, the pump 62 and the vent valves 61, 67 are described in the passive voice as the subject, such as "the pump 62 is turned on".

First Embodiment

The malfunction diagnosis of the first embodiment will be described with reference to FIGS. 3 to 12. The pressure threshold values as follows have the relationship of "PE>atmospheric pressure>PC>PA>PB" and "atmospheric pressure>PF>PA". At the start in FIG. 3, the purge valve 42 is closed. At time t1, the first vent valve 61 is closed in S11, and the pump 62 is turned on in S12. When the leakage diagnosis device 60 is normal, the first atmospheric passage 31 is blocked, and ventilation is enabled from the canister 23 to the atmospheric opening 33 via the second atmospheric passage 32.

At time t2, in S13, it is determined whether the pressure sensor output value Psns is equal to or less than the threshold value PA. In FIGS. 5 to 8, the pressure sensor output value Psns is equal to or less than the threshold value PA, and determination of YES is made in S13. Thus, the pump 62 is turned off in S14. When determination of NO is made in S13, it is determined in S60 that "vent valve open stuck, or pump malfunction, or filter clogging, or large leakage in the system" occurs. The process proceeds to FIG. 4.

Figure 5:
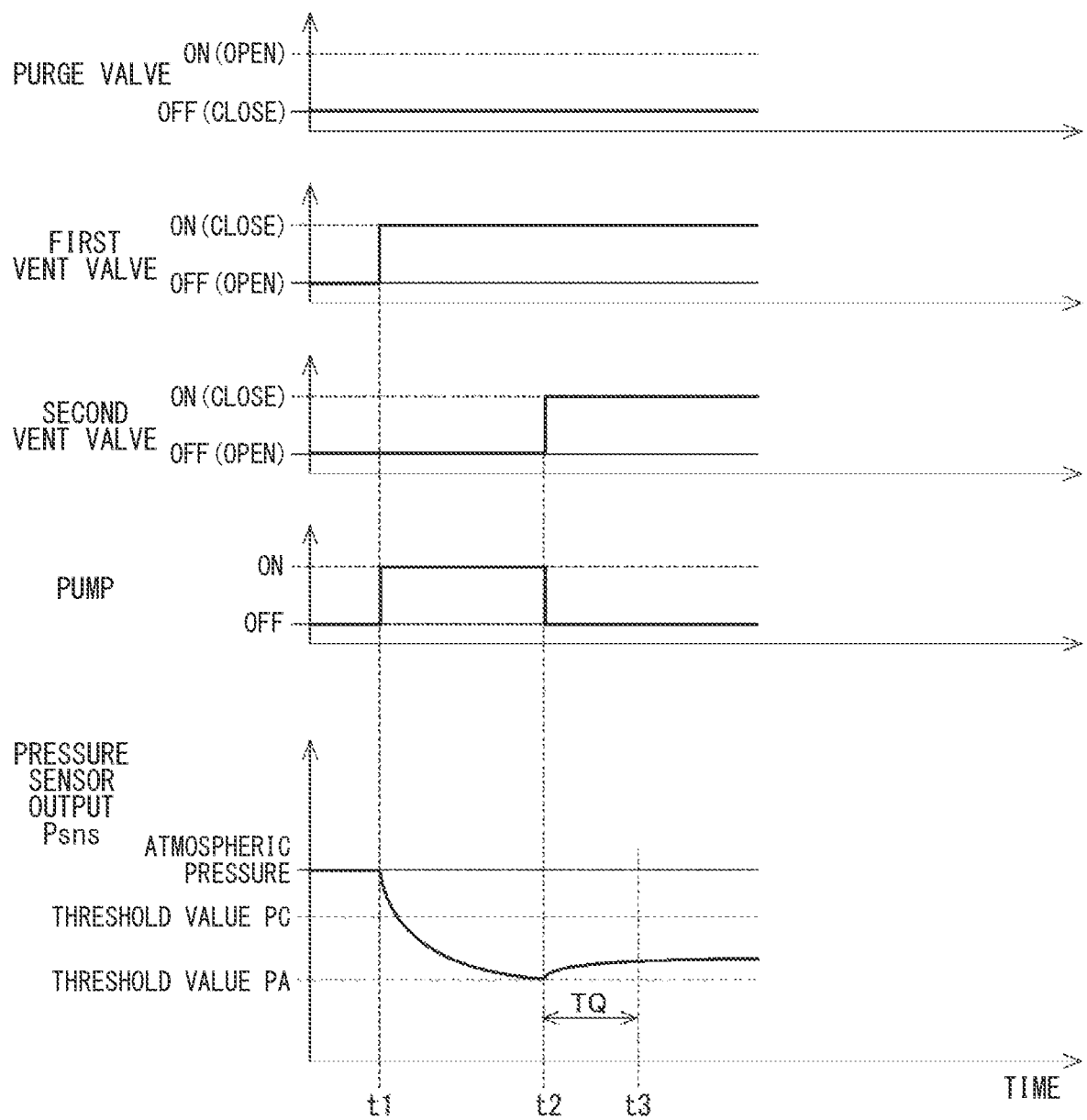
FIG. 5 is a time chart in a case of no system small leakage and no LCM malfunction.
Figure 6:
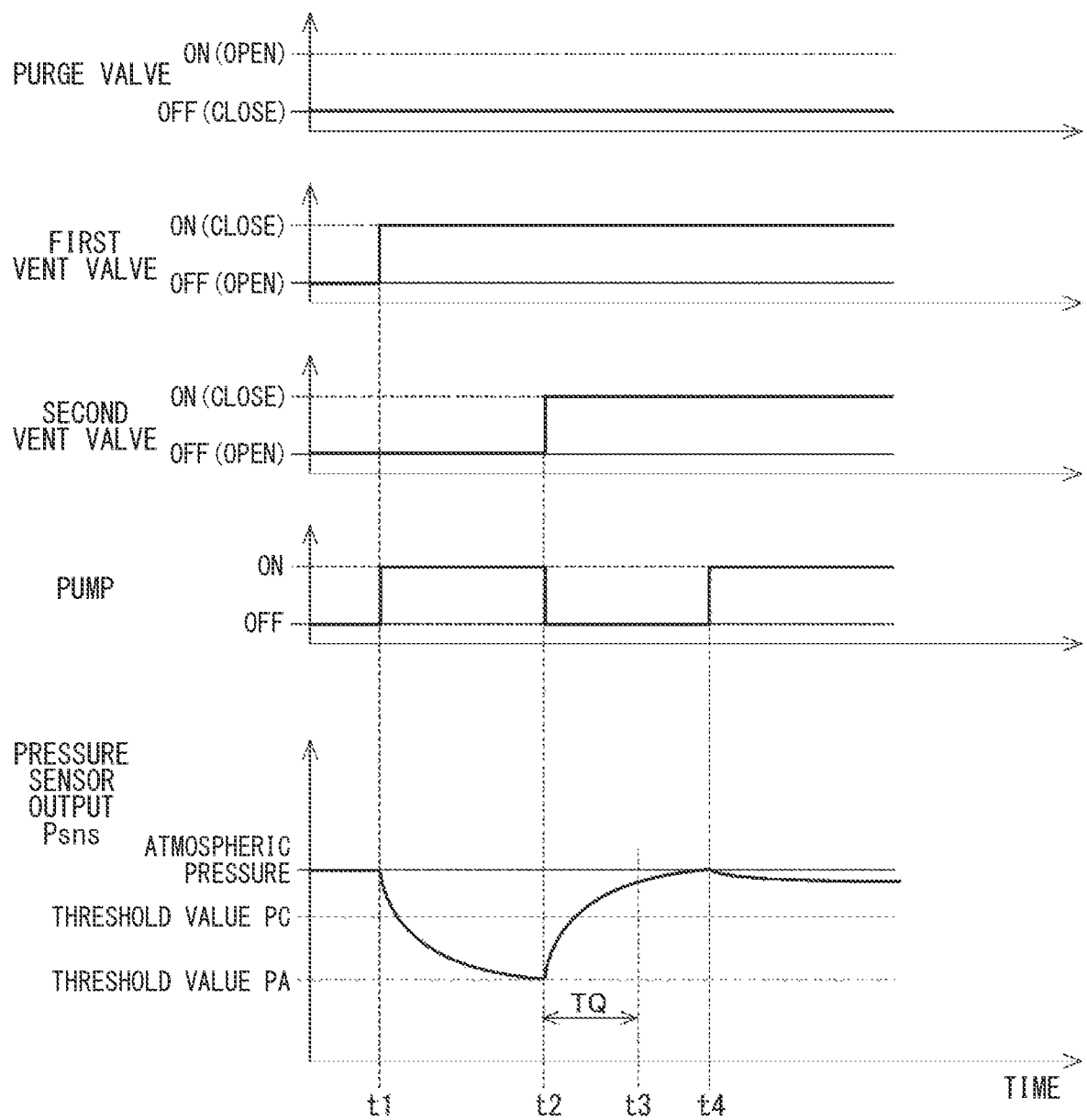
FIG. 6 is a time chart in a case of a system small leakage.
Figure 7:
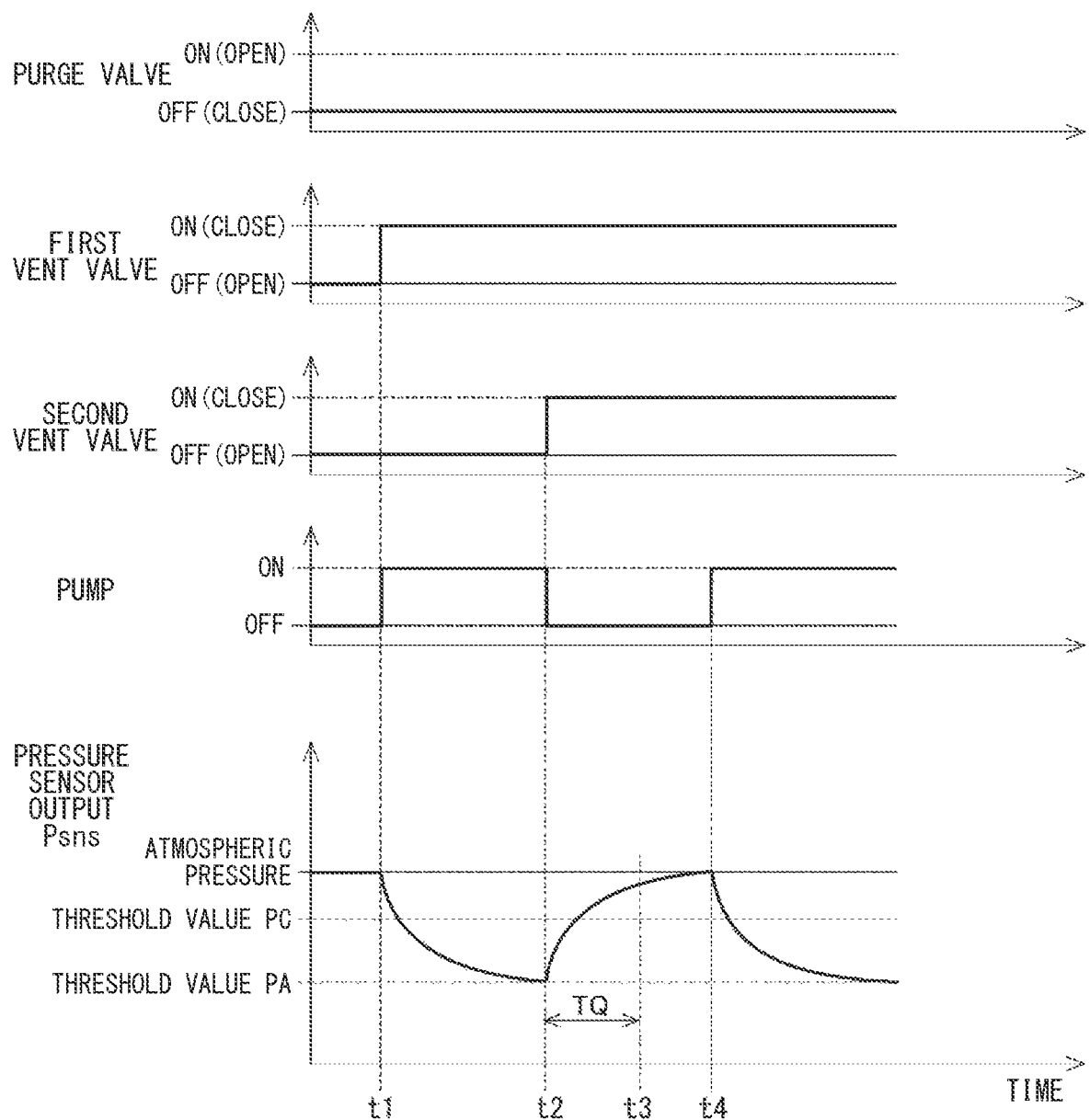
FIG. 7 is a time chart in a case of a second vent valve open seizure.

In S15 following S14, it is determined whether the pressure sensor output value Psns is equal to or greater than the threshold value PB. When determination of YES is made, the second vent valve 67 is closed in S16. Here, a waiting time for determination in S15 may be provided between the pump OFF in S14 and the closing of the second vent valve in S16. FIGS. 5 to 7 show that the pump is turned off and the second vent valve is closed at the same time t2 for the sake of convenience. In S14 and S16, when the system and the leakage diagnosis device 60 are normal, the second atmospheric passage 32 is blocked, and the pressure in the system is maintained.

In S17, it is determined whether a time for the pressure sensor output value Psns to reach the threshold value PC is larger than a threshold value TQ after the second vent value 67 is closed. That is, the pressure sensor output value Psns at the time t3 after the threshold value TQ elapses from the time t2 is compared with the threshold PC. As shown in FIG. 5, when the pressure sensor output value Psns at time t3 is smaller than the threshold value PC, and determination of YES is made in S17, it is determined in S70 that "no small leakage in system and no LCM malfunction" occurs. When determination of NO is made in S17, it is determined in S678 that "second vent valve open stuck or small leakage in the system" occurs. Then, as shown in FIGS. 6 and 7, at time t4, the pump 62 is turned on in S18.

In S19, it is determined whether the pressure sensor output value Psns is greater than the threshold value PA after the pump 62 is turned on. As shown in FIG. 6, if the pressure sensor output value Psns does not decrease to the threshold value PA, YES is determined in S19, and it is determined in S68 that "small leakage in system" occurs. As shown in FIG. 7, when the pressure sensor output value Psns decreases to the threshold value PA, it is determined as NO in S19, and it is determined in S67 that "second vent valve open stuck" occurs.

Figure 8:
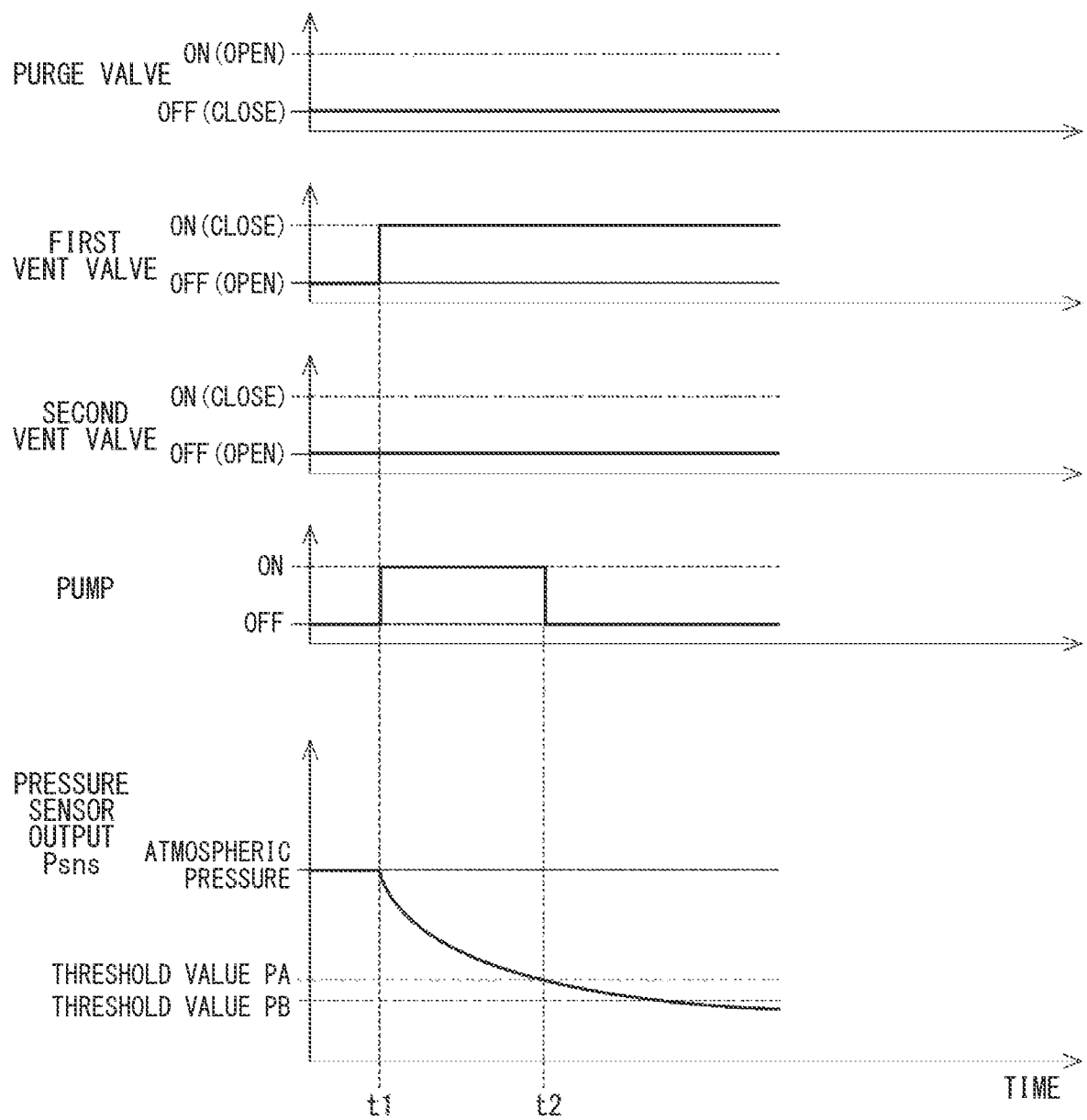
FIG. 8 is a time chart in a case of a pump off incapability.

Returning to S15, as shown in FIG. 8, when the pressure sensor output value Psns continues to decrease and falls below the threshold value PB after the pump off command is made, it is determined in S66 that "pump off incapability" occurs.

Figure 4:
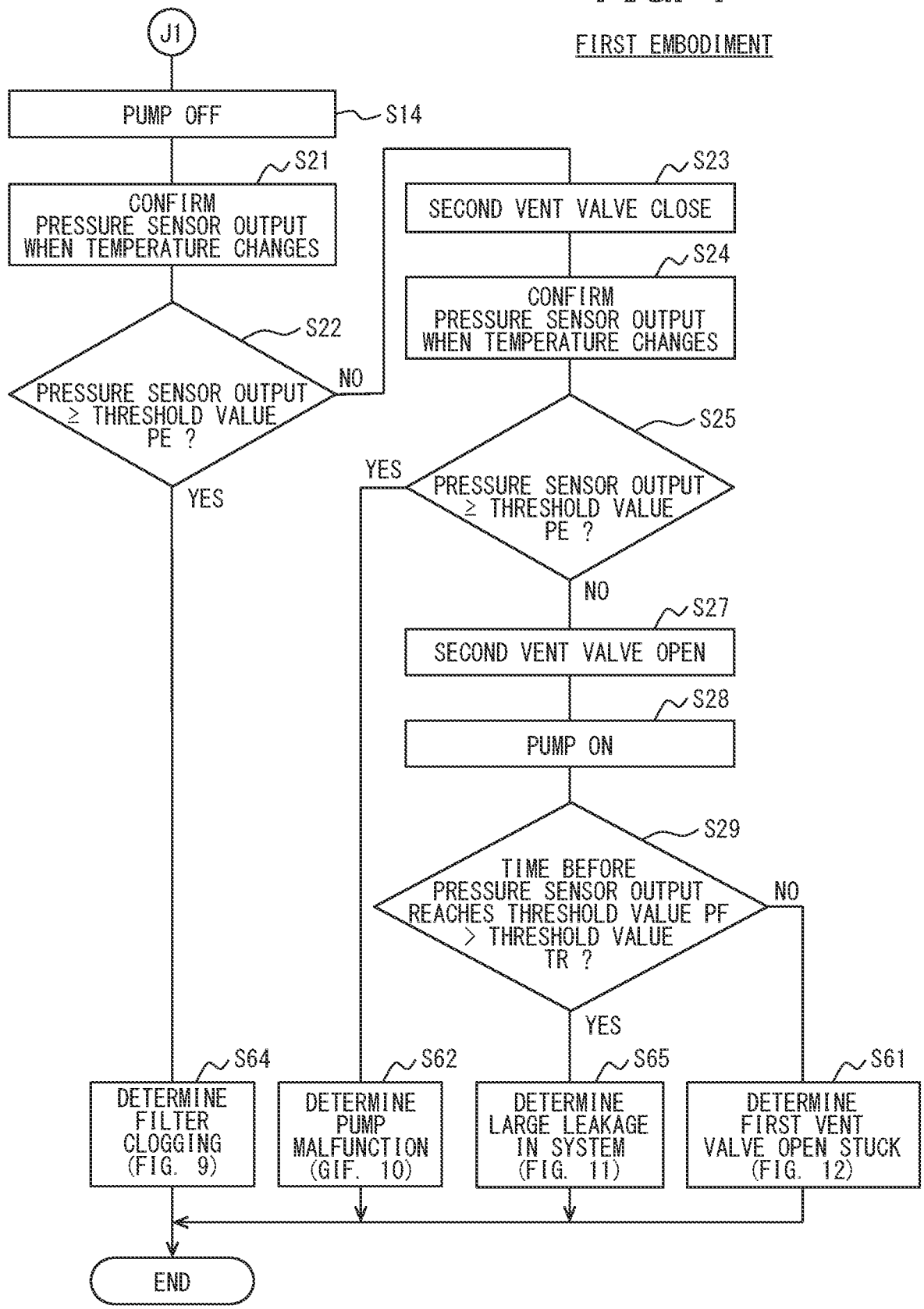
FIG. 4 is a flowchart showing a malfunction diagnosis implemented by a malfunction diagnosis device of the first embodiment.

Subsequently, FIG. 4 is referred to. After the determination of NO is made in S13, the pump 62 is turned off in S14. At this time, the second vent valve 67 is open. In S21, the pressure sensor output value Psns when the ambient temperature of the leakage diagnosis device 60 changes (here, increases) is confirmed. Here, the system temperature may be positively heated by a heating device or the like. Alternatively, the process may wait for the temperature to increase as the temperature increases in the daytime. When the temperature increases while the system is blocked, the air in the piping expands, and the pressure in the piping increases. Therefore, the pressure sensor output value Psns changes as the system temperature changes.

Figure 9:
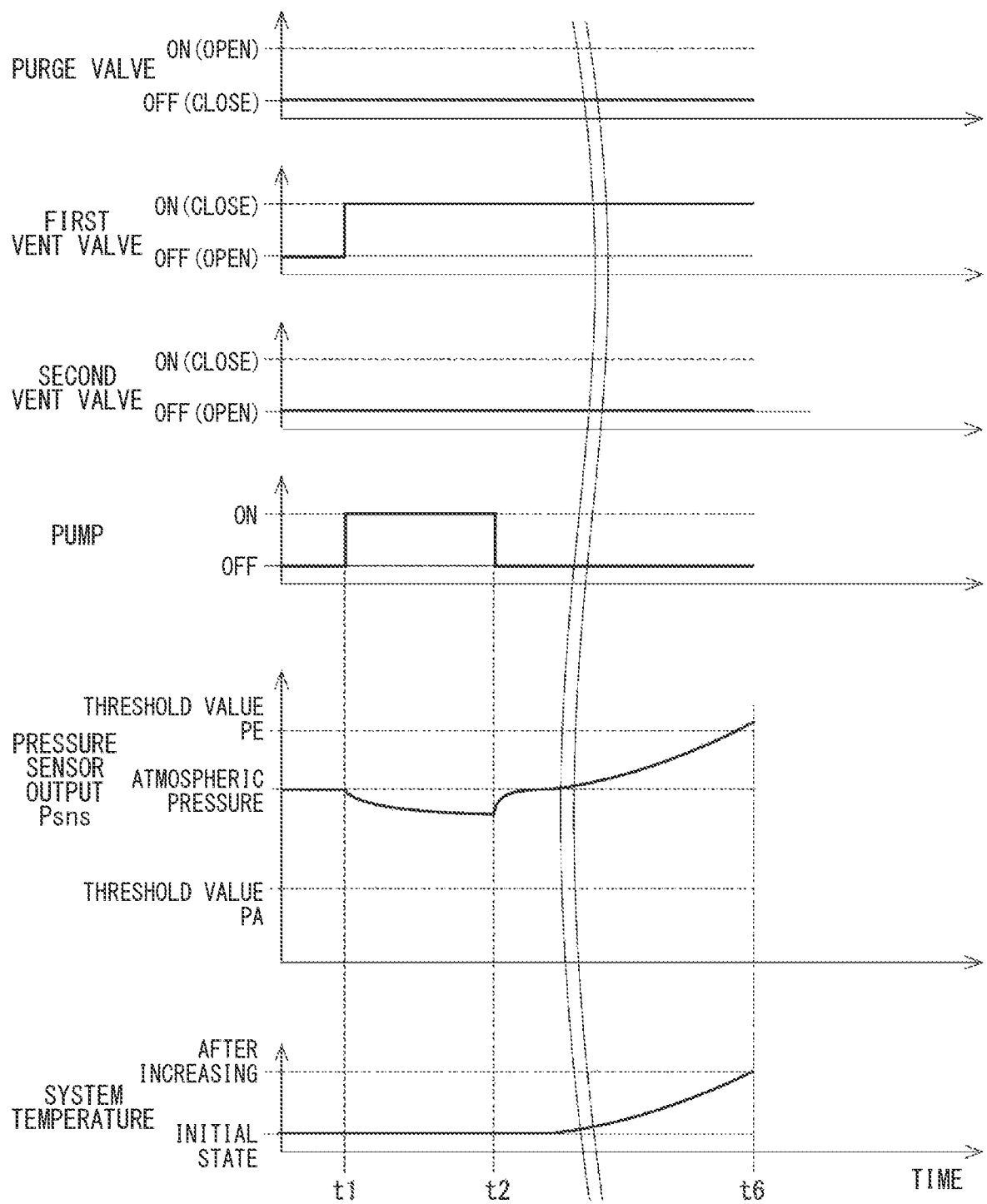
FIG. 9 is a time chart in a case of a filter clogging.

In FIGS. 9, the system temperature increases from time t2 to time t6. In S22, it is determined whether the pressure sensor output value Psns after the temperature increase is equal to or higher than the threshold value PE. The threshold value PE may be set at a suitable time according to the system temperature after the system temperature increases. As shown in FIG. 9, when determination of YES is made in S22, it is determined in S64 that "filter clogging" occurs.

The case in which determination of NO is made in S22, that is, the case of not "filter clogging" will be described by going back in the steps and time for convenience of explanation. In S23, the second vent valve 67 is closed at the same time that the pump 62 is turned off in S14 at time t2. Then, in S24, similarly to S21, the pressure sensor output value Psns when the ambient temperature of the leakage diagnosis device 60 changes is confirmed.

Figure 10:
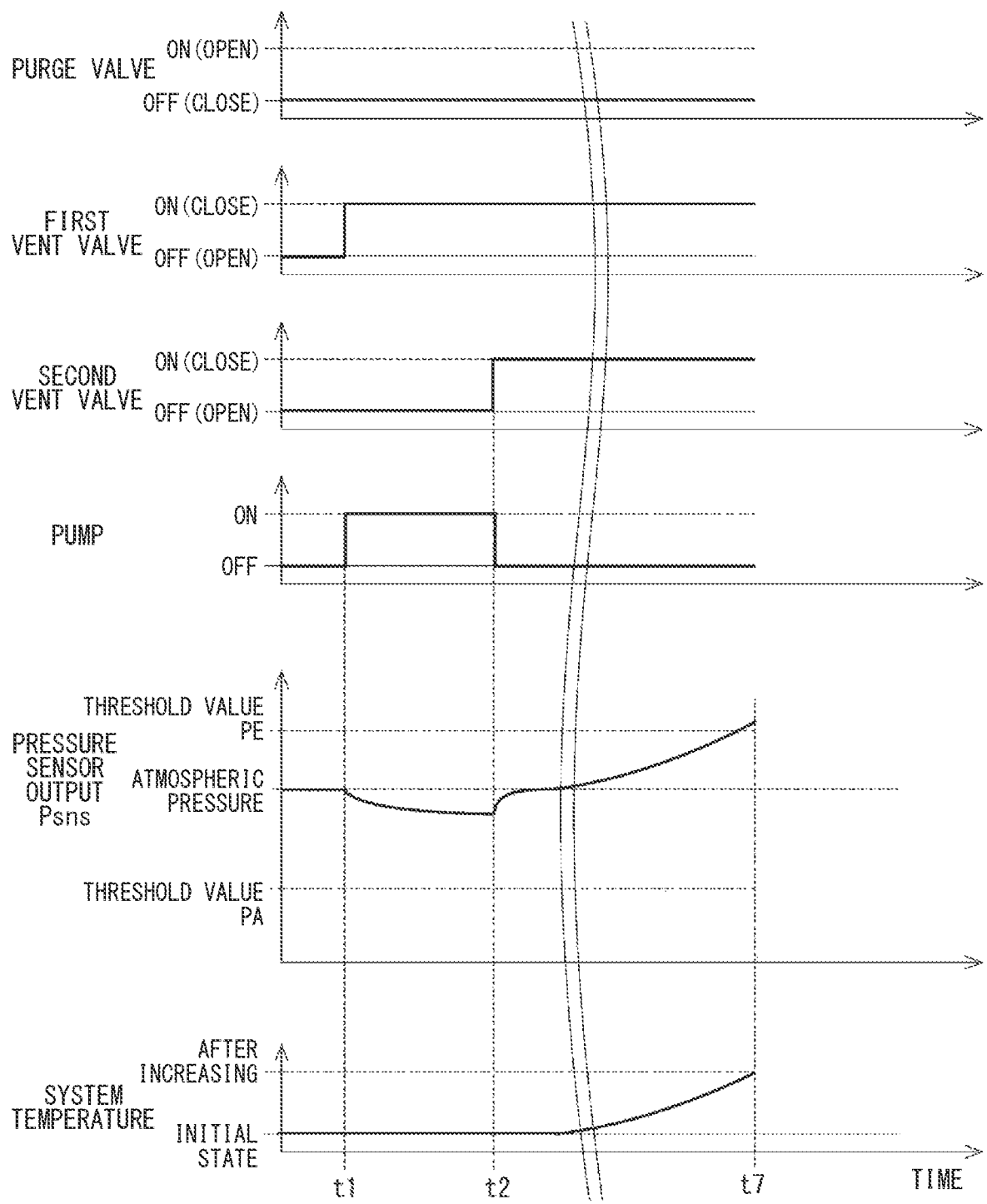
FIG. 10 is a time chart in a case of a pump malfunction.
Figure 11:
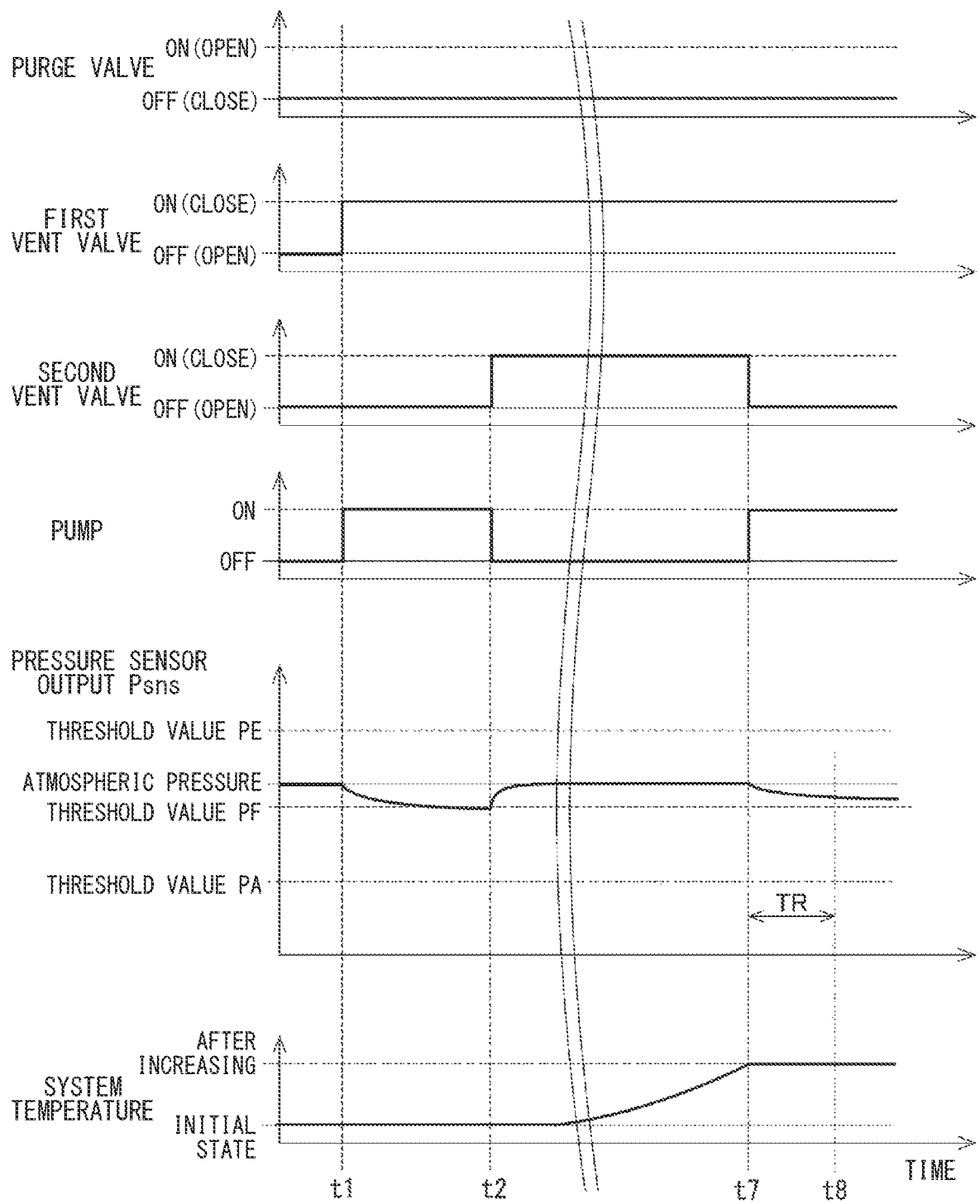
FIG. 11 is a time chart in a case of large leakage in system.
Figure 12:
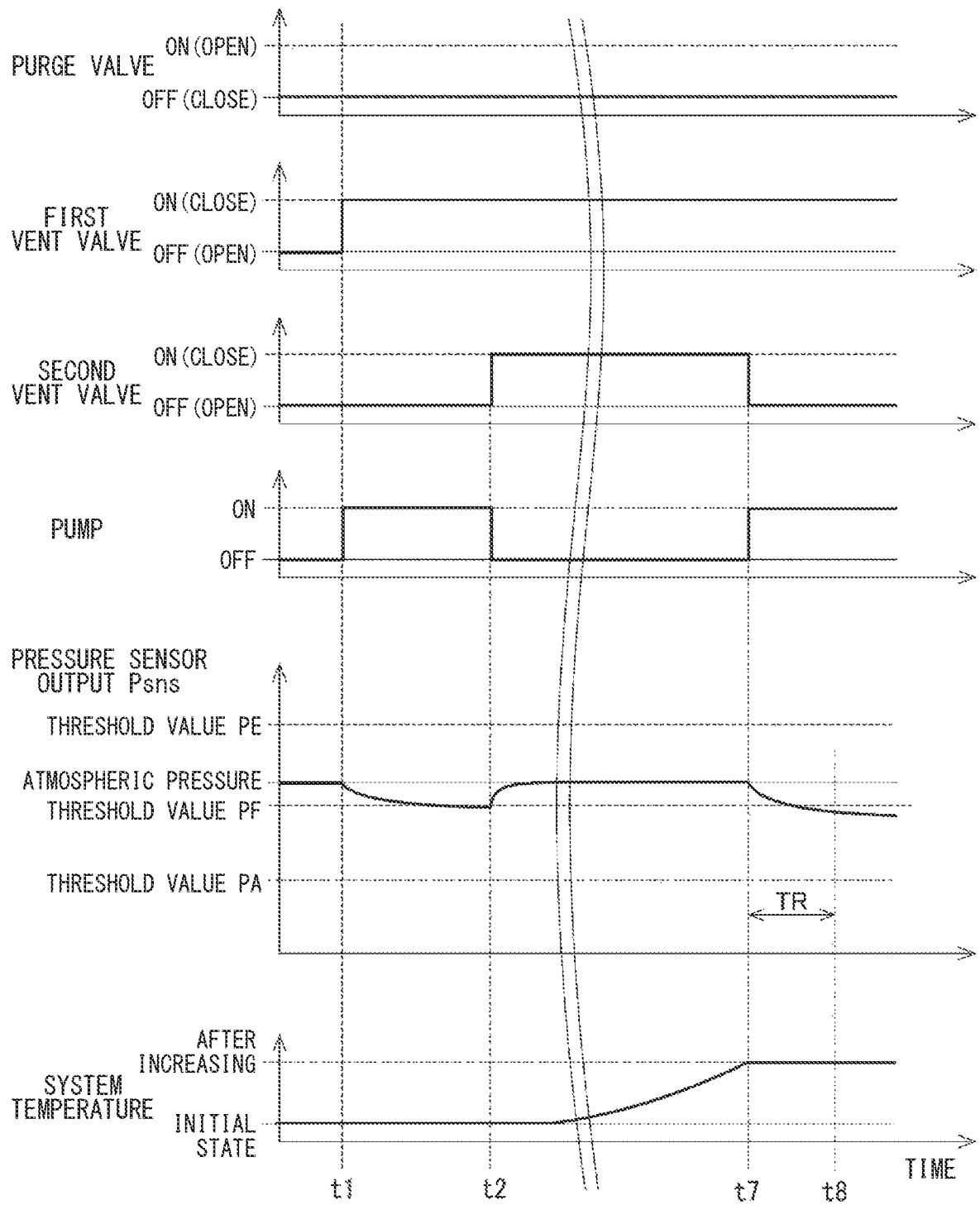
FIG. 12 is a time chart in a case of a first vent valve open seizure.
Figure 13:
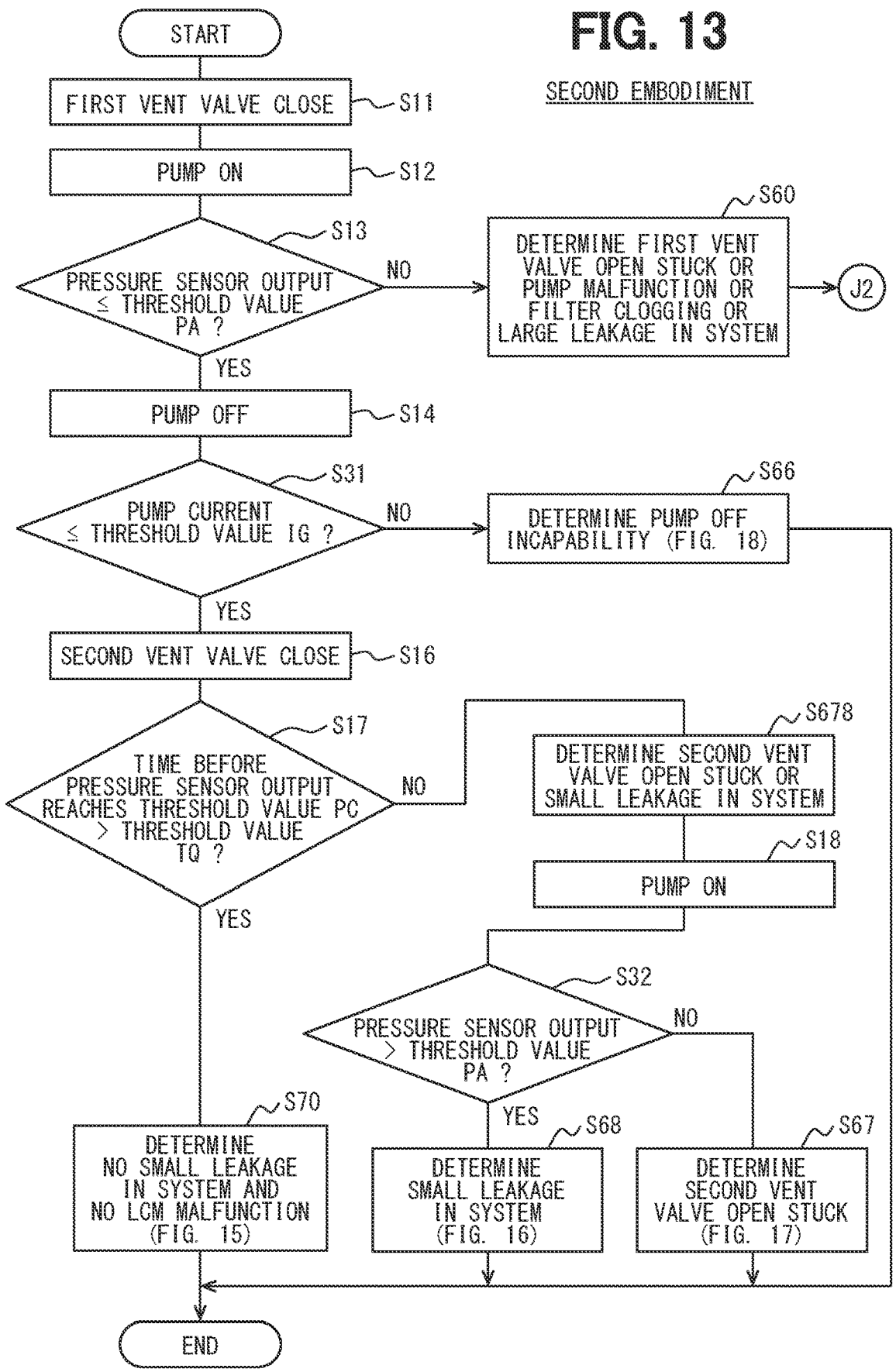
FIG. 13 is a flowchart showing a malfunction diagnosis implemented by a malfunction diagnosis device of a second embodiment.

From time t2 to time t7 in FIGS. 10 to 12, the system temperature increases while the second vent valve 67 is closed. In S25, similarly to S 22, it is determined whether the pressure sensor output value Psns after the temperature increase is equal to or higher than the threshold value PE. As shown in FIG. 10, when determination of YES is made in S25, it is estimated that the second vent valve 67 is normally closed. Then, in S62, the factor determined as NO in S13 is determined as "pump malfunction".

When determination of NO is made in S25, at time t7, the second vent valve 67 is opened in S27, and the pump 62 is turned on in S28. In S29, it is determined whether a time for the pressure sensor output value Psns to reach the threshold value PF is larger than the threshold value TR after the pump 62 is turned on. That is, the pressure sensor output value Psns at the time t8 after the threshold value TR elapses from the time t7 is compared with the threshold value PF.

As shown in FIG. 11, when the pressure sensor output value Psns at time t8 is larger than the threshold value PF, determination of YES is made in S29, and it is determined in S65 that "large leakage in system" occurs. When a large leakage in the system occurs, the pump 62 sucks gas containing evaporative fuel, so the pump load becomes larger than when sucking gas that does not contain evaporative fuel. It takes a long time to reduce the pressure in the piping to the threshold value PF.

As shown in FIG. 12, when the pressure sensor output value Psns at time t8 is equal to or less than the threshold value PF, determination of NO is made in S29, and it is determined in S61 that "first vent valve open stuck" occurs. In the case where open suck of the first vent valve 61 occurs, the pump 62 draws gas that does not contain evaporative fuel. Therefore, the pump load is small, and the time for the pressure in the pipe to decrease to the threshold value PF is short.

As described above, the malfunction diagnosis of the first embodiment includes the step of evaluating the pressure sensor output value Psns with the first vent valve 61 closed, the second vent valve 67 opened, and the pump 62 turned on. S13 corresponds to this step. Herein, as a specific method for evaluating the pressure sensor output value Psns, the pressure sensor output value Psns is compared with the predetermined pressure threshold value.

The malfunction diagnosis of the first embodiment further includes the step of evaluating the change in the pressure sensor output value Psns immediately after closing the second vent valve 67 from the open state. S17 corresponds to this step. Here, as a specific method for evaluating the change in the pressure sensor output value Psns, the time for the pressure sensor output value Psns to reach the predetermined pressure threshold is compared with the predetermined time threshold value.

The malfunction diagnosis of the first embodiment further includes the step of evaluating the change in the pressure sensor output value Psns immediately after the pump 62, which is turned off, is turned on with the first vent valve 61 closed, and the second vent value 67 opened. S29 corresponds to this step. The specific method for evaluating the change in the pressure sensor output value Psns is similar to the method described above.

The malfunction diagnosis of the first embodiment further includes the step of evaluating the pressure sensor output value Psns when the ambient temperature of the leakage diagnosis device 60 changes with the first vent valve 61 closed, the second vent valve 67 opened, and the pump 62 turned off. S22 and S25 correspond to this step.

The malfunction diagnosis device 80 of the first embodiment is configured to perform various types of malfunction diagnosis of the leakage diagnosis device 60 by combining the above steps. Therefore, the malfunction diagnosis device 80 is capable of appropriately discriminating between the leak of the evaporative fuel treatment device 10 and the malfunction of the leakage diagnosis device 60.

Second Embodiment

The malfunction diagnosis of the second embodiment will be described with reference to FIGS. 13 to 22. The description of the overlapping portion with the first embodiment will be omitted as appropriate. S11 to S14 are the same as those in the first embodiment. When the pump 62 is turned on at times t1 to t2, when the leakage diagnosis device 60 is normal, the pump current Ipump becomes a reference value I0. The pump current threshold values have the following relationship of "IH>I0>IG (>0)" and "IK>IL>I0>IM".

Figure 15:
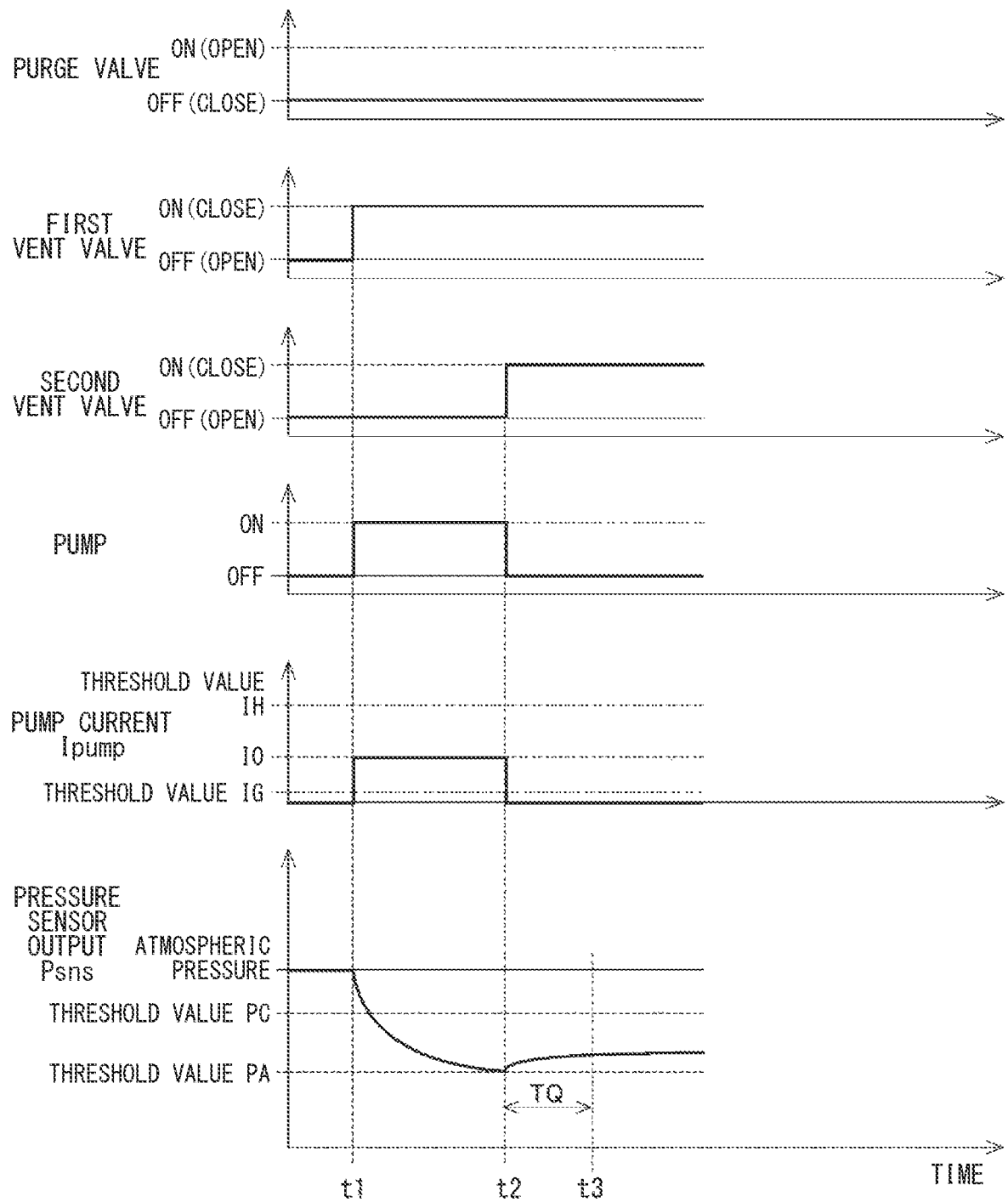
FIG. 15 is a time chart in a case of no system small leakage and no LCM malfunction.
Figure 16:
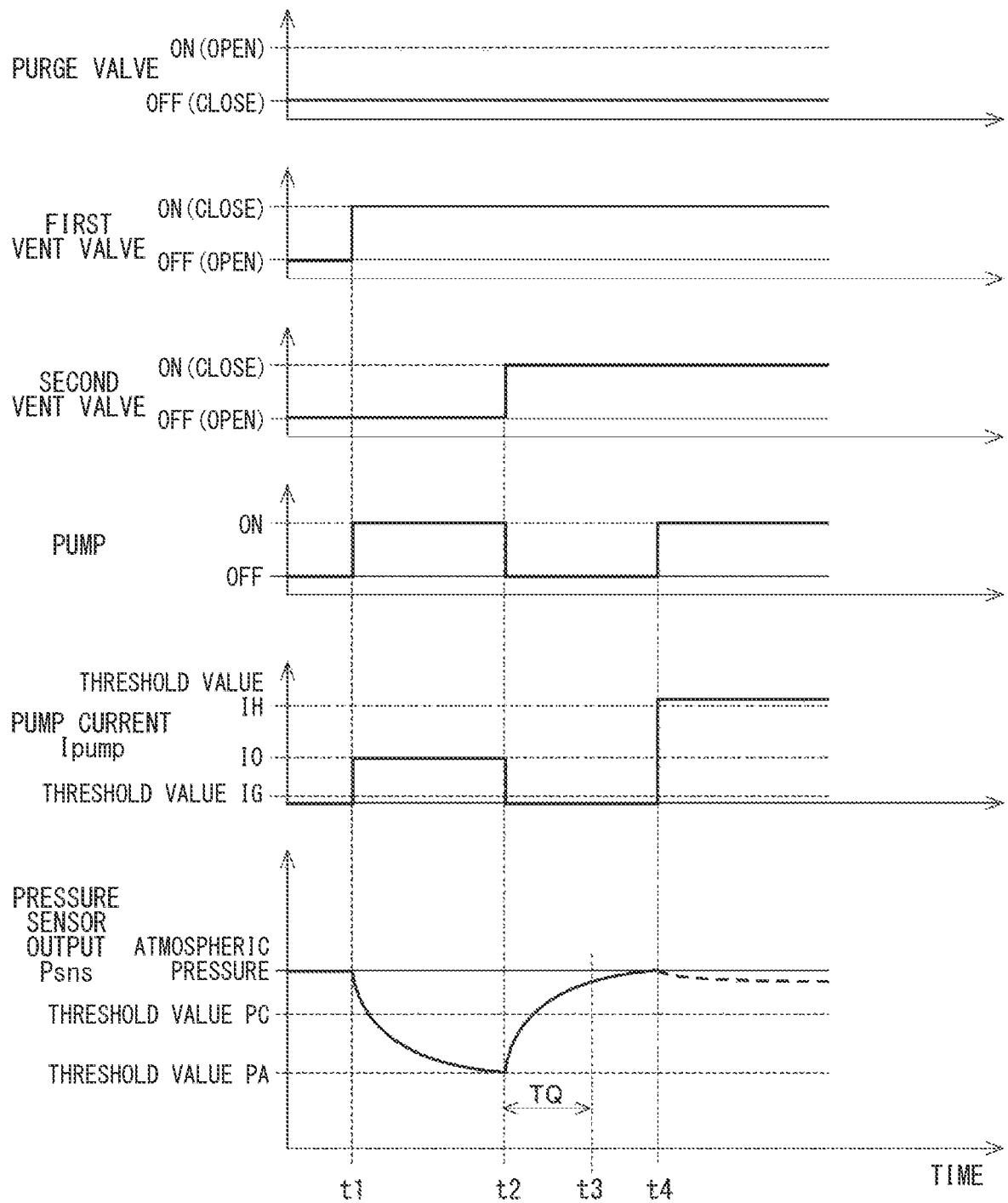
FIG. 16 is a time chart in a case of a system small leakage.
Figure 17:
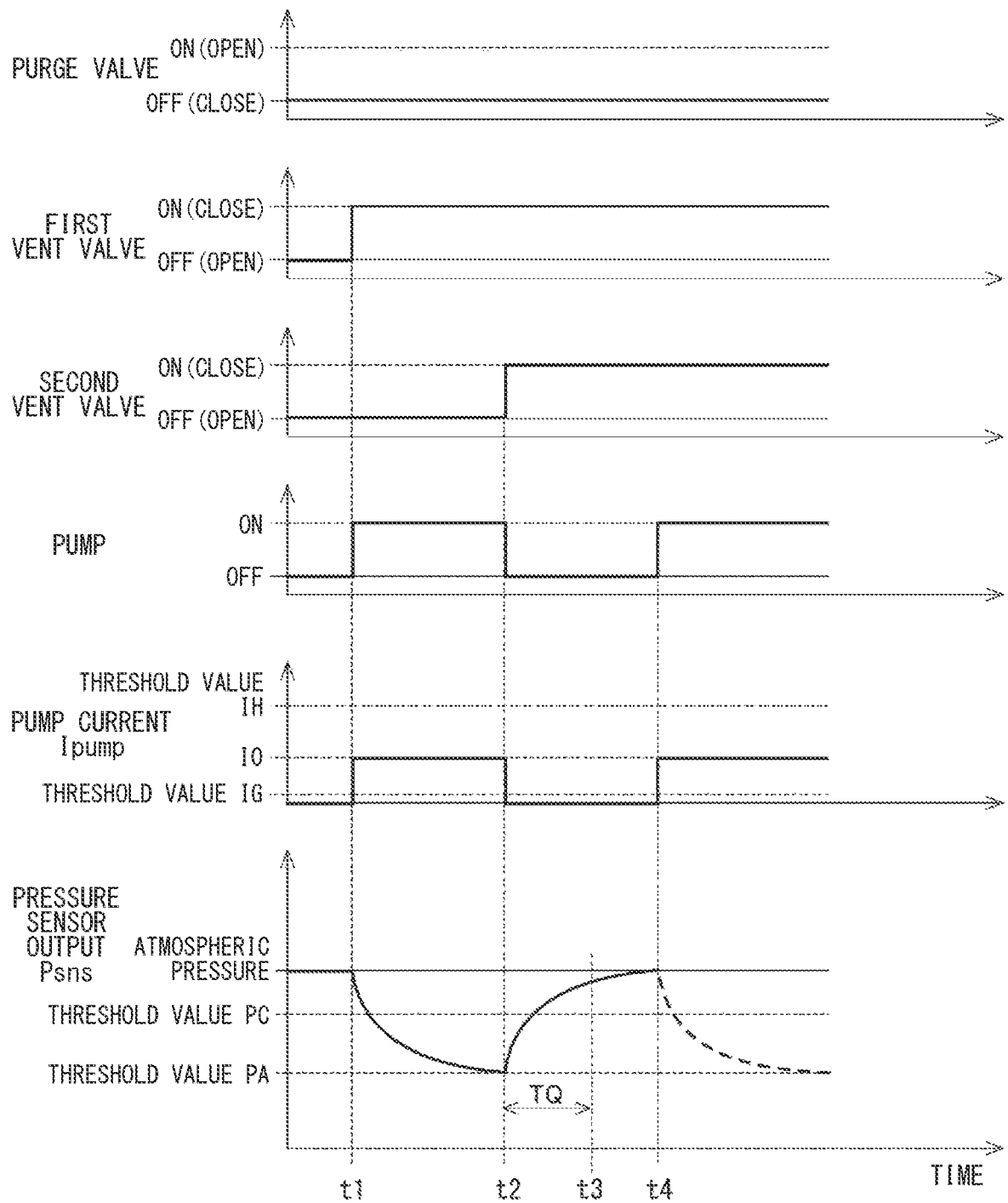
FIG. 17 is a time chart in a case of a second vent valve open seizure.

After the pump 62 is turned off in S14, it is determined in S31 whether the pump current Ipump is equal to or less than the threshold value IG that is a small value close to 0. When determination of YES is made, the second vent valve 67 is closed in S 16. Here, a waiting time for determination in S31 may be provided between the pump OFF in S14 and the closing of the second vent valve in S16. FIGS. 15 to 17 show that the pump is turned off and the second vent valve is closed at the same time t2 for the sake of convenience.

S17 is the same as in the first embodiment, and as shown in FIG. 15, when determination of YES is made in S17, it is determined in S70 that "no small leakage in system and no LCM malfunction" occurs. When determination of NO is made in S17, S678 and S18 are the same as in the first embodiment.

In S32, it is determined whether the pump current Ipump is greater than the threshold value IH after the pump 62 is turned on. As shown in FIG. 16, when the pump current Ipump is greater than the threshold value IH, a determination of YES is made at S32, and it is determined in S68 that "a small leakage in system" occurs. As shown in FIG. 17, when the pump current Ipump is equal to or less than the threshold value IH, determination of NO is made in S32, and it is determined in S67 that "second vent valve open stuck" occurs.

Figure 18:
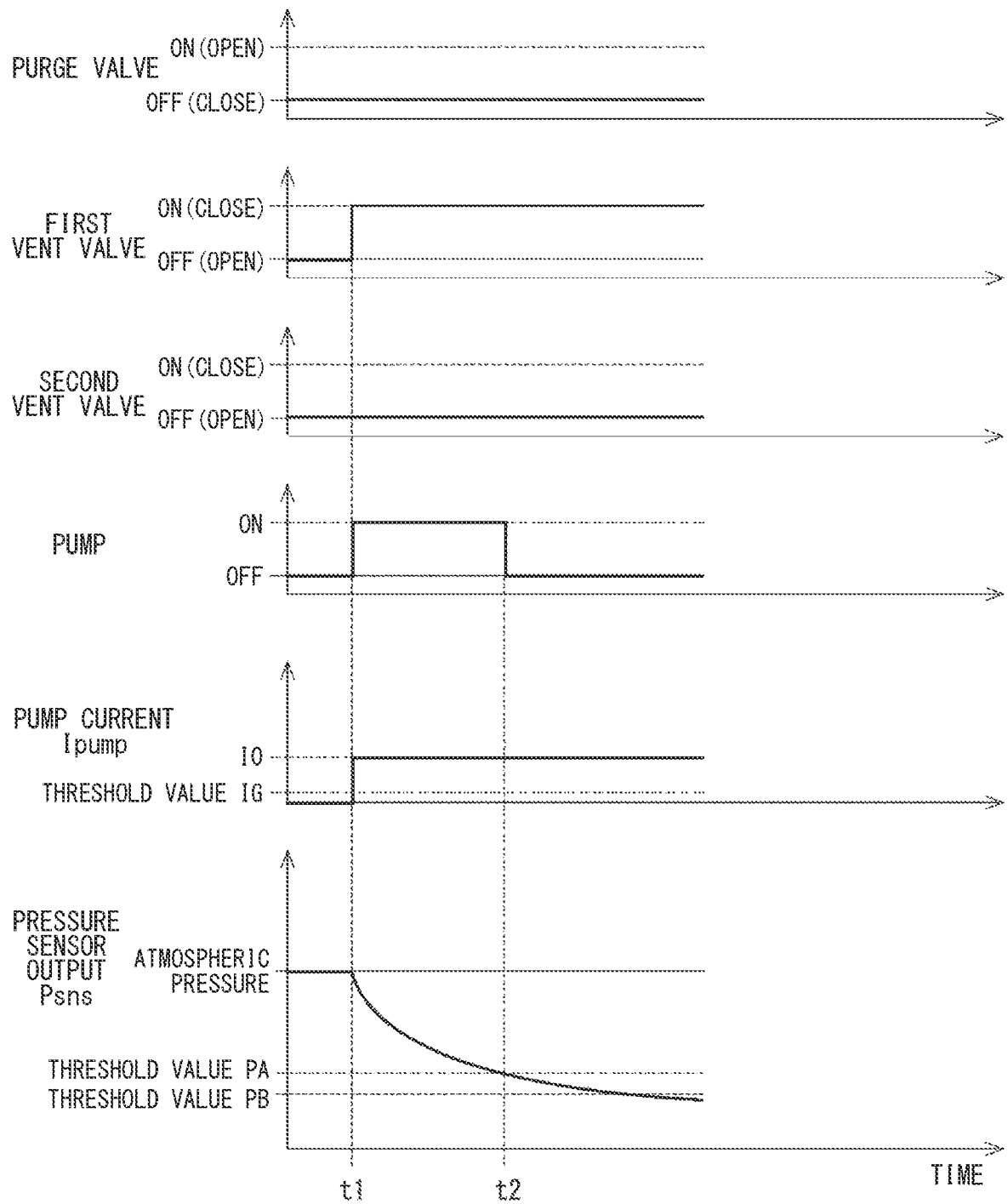
FIG. 18 is a time chart in a case of a pump off incapability.

Returning to S31, as shown in FIG. 18 when the pump current Ipump is larger than the threshold value IG after the pump off command is made, determination of NO is made in S31, and it is determined in S66 that "pump off incapability" occurs.

Figure 14:
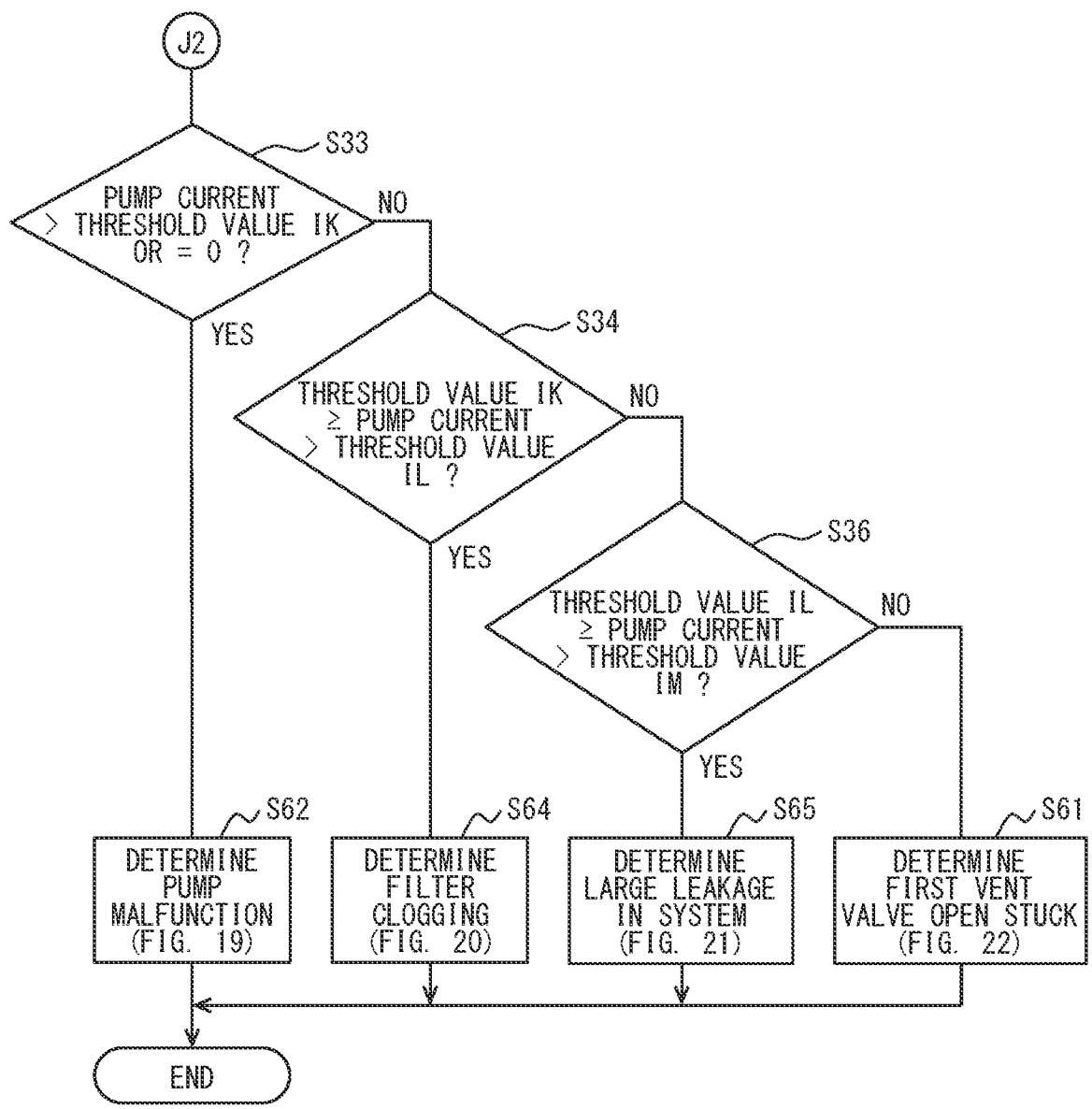
FIG. 14 is a flowchart showing a malfunction diagnosis implemented by a malfunction diagnosis device of the second embodiment.
Figure 19:
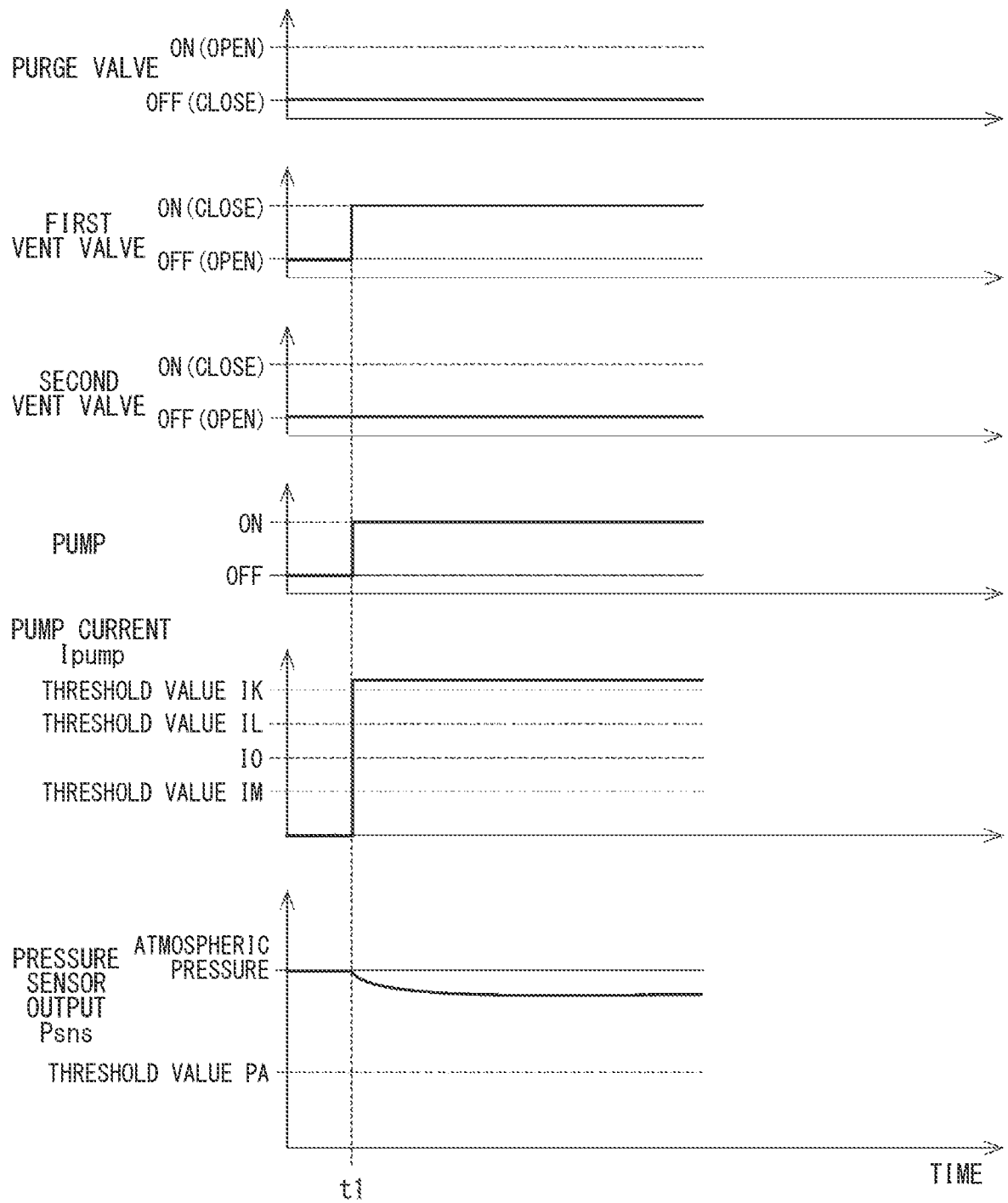
FIG. 19 is a time chart in a case of a pump malfunction.
Figure 20:
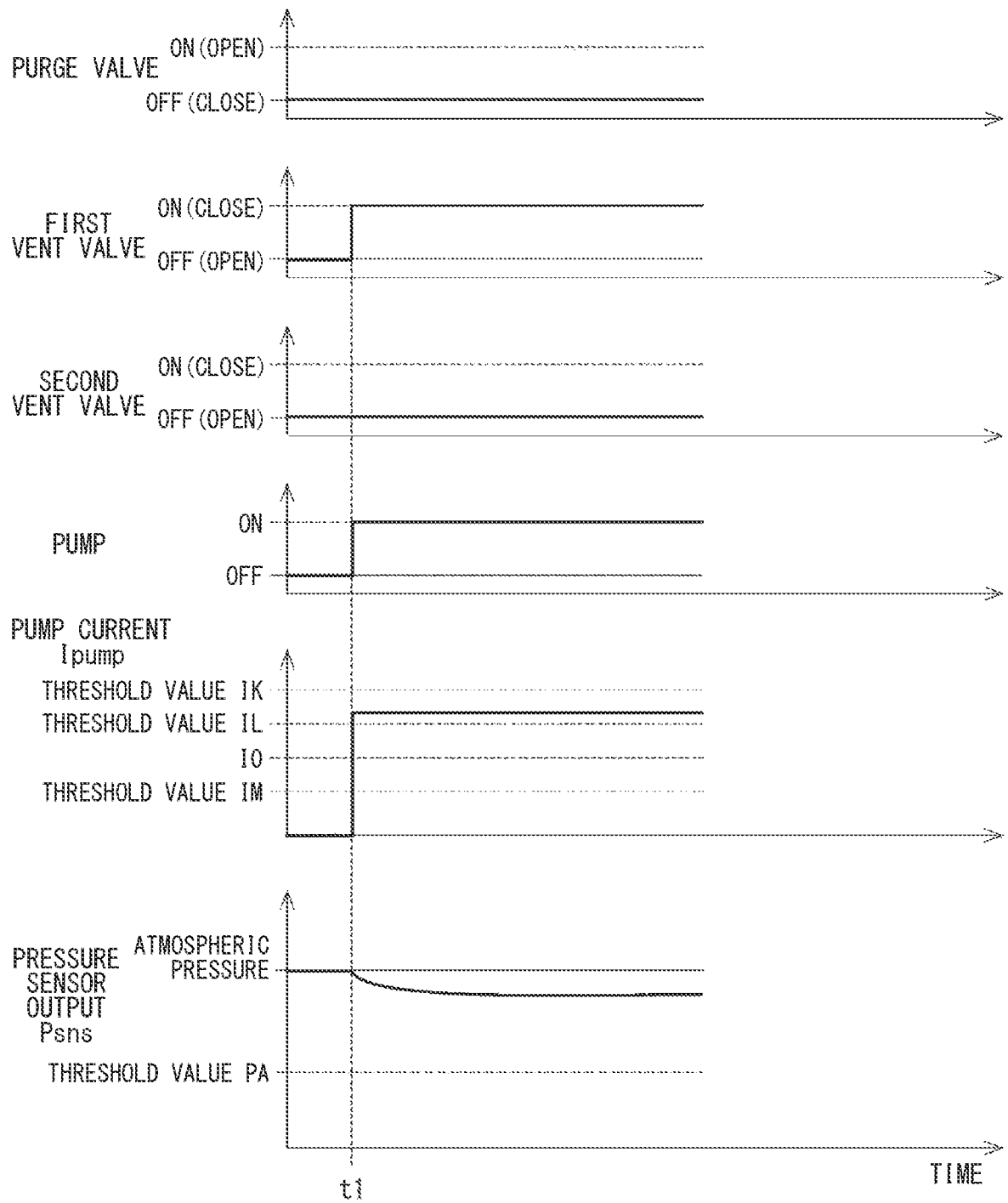
FIG. 20 is a time chart in a case of a filter clogging.

Subsequently, FIG. 14 is referred to. After determination of NO is made in S13, in S33 it is determined whether the pump current Ipump is larger than or equal to the threshold value IK. As shown in FIG. 19, when determination of YES is made in S33, it is determined in S62 that "pump malfunction" occurs. When determination of NO is made in S33, it is determined in S34 whether the pump current Ipump is larger than the threshold value IL and is equal to or less than the threshold value IK. As shown in FIG. 20, when determination of YES is made in S34, it is determined in S64 that "filter clogging" occurs.

Figure 21:
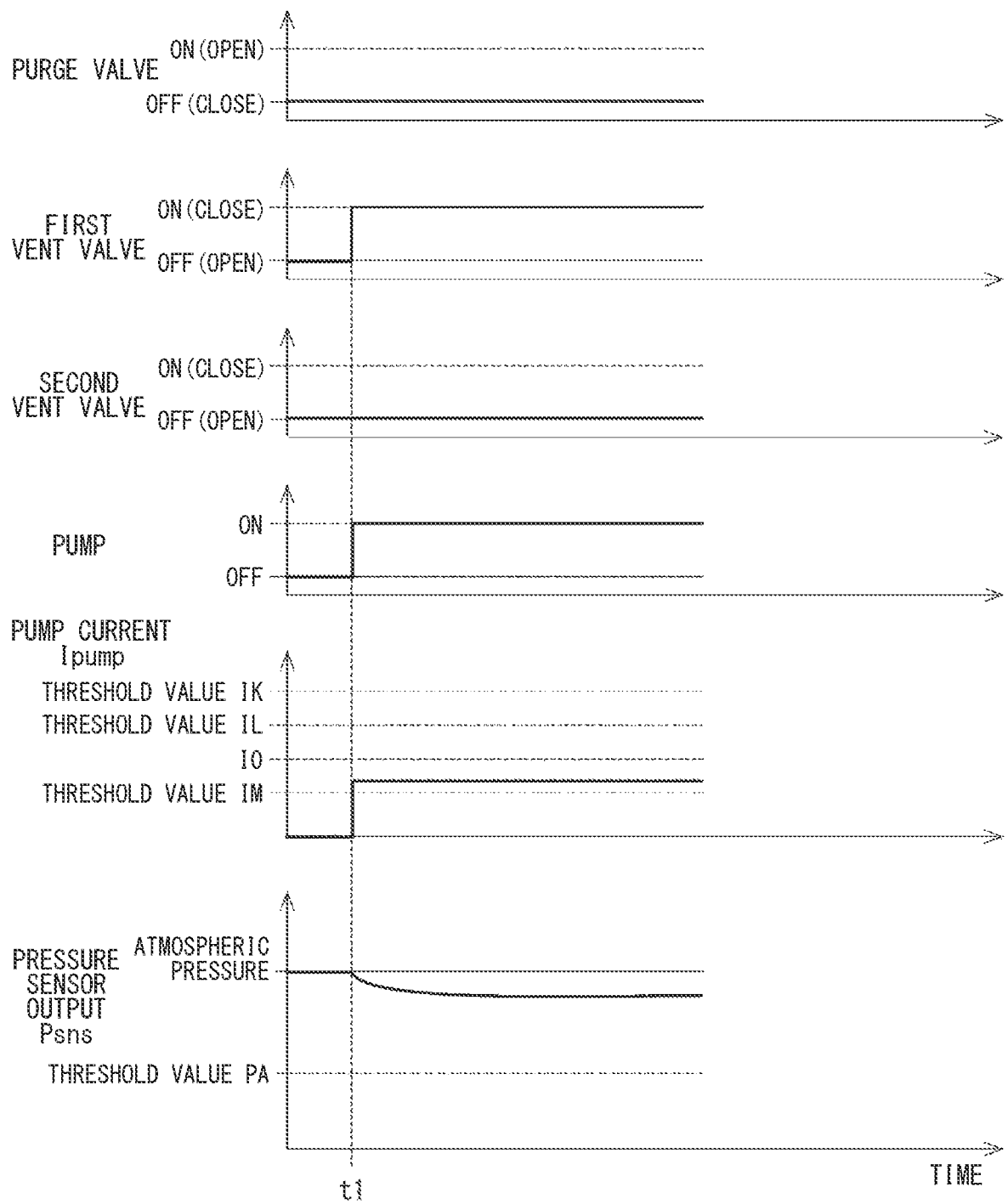
FIG. 21 is a time chart in a case of large leakage in system.
Figure 22:
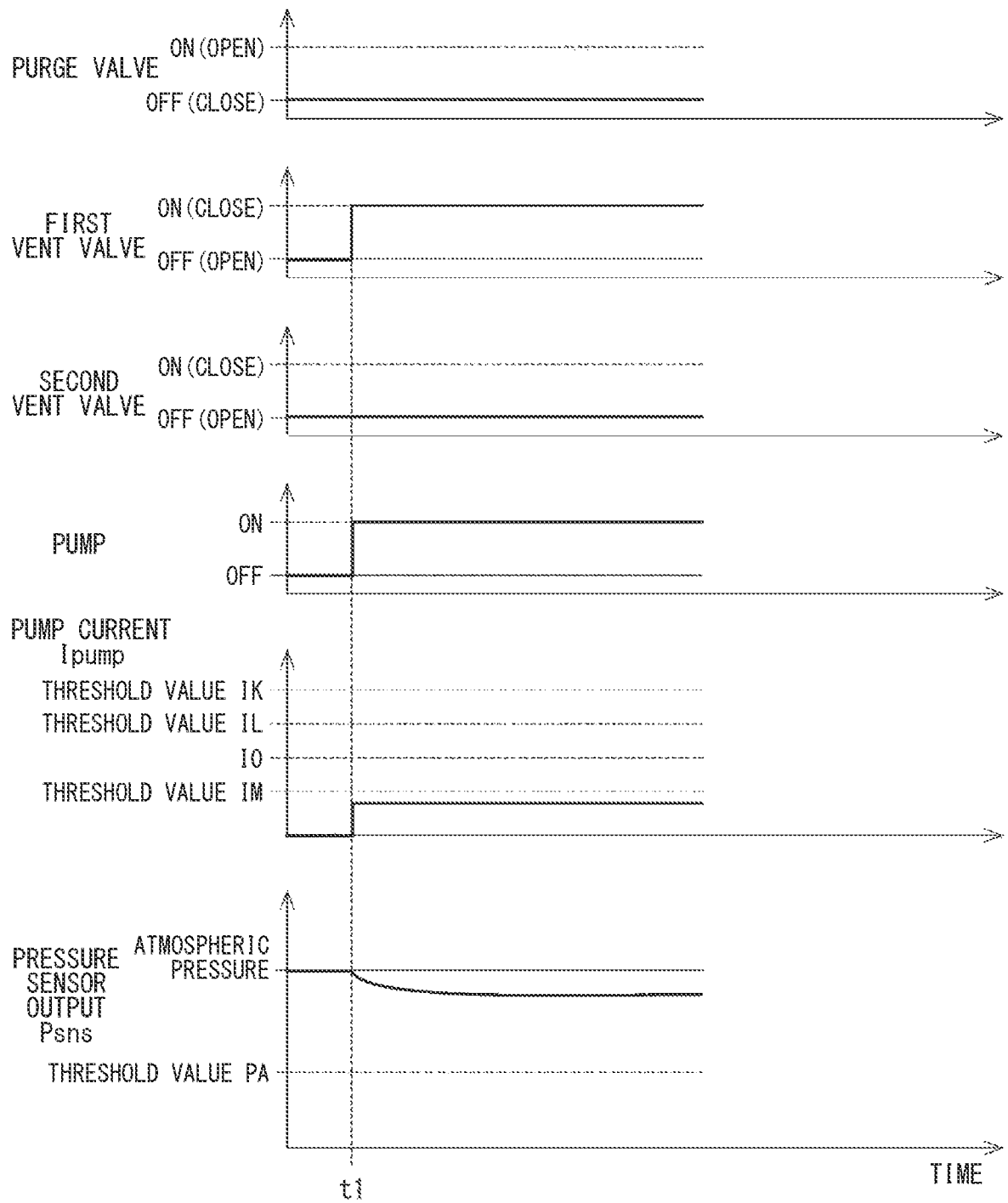
FIG. 22 is a time chart in a case of a first vent valve open seizure.
Figure 23:
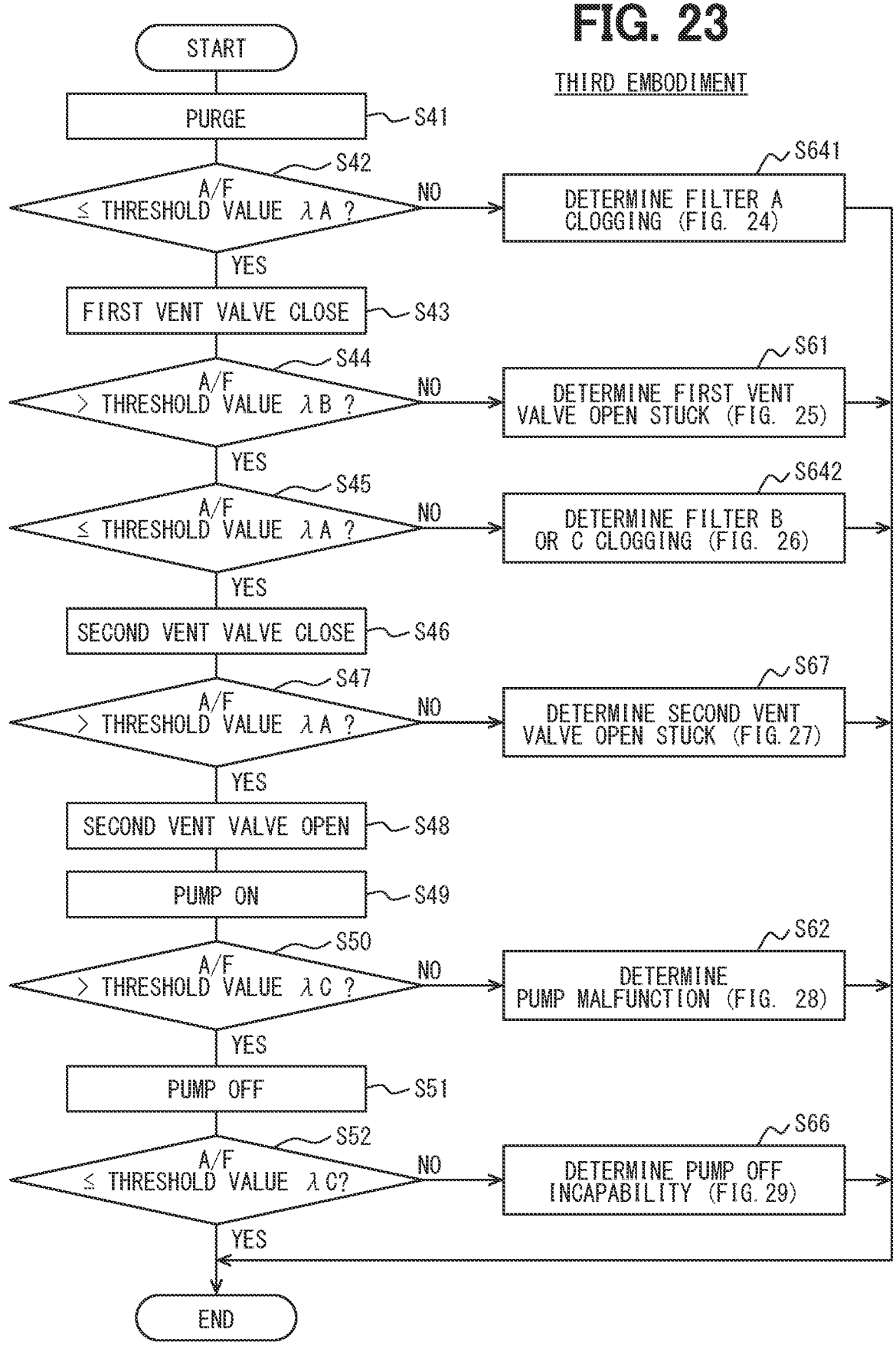
FIG. 23 is a flowchart showing a malfunction diagnosis implemented by a malfunction diagnosis device of a third embodiment.

When determination of NO is made in S34, it is determined in S36 whether the pump current Ipump is larger than the threshold value IL and is equal to or less than the threshold value IK. As shown in FIG. 21, when determination of YES is made in S36, it is determined in S65 that "large leakage in system" occurs. As shown in FIG. 22, when the pump current Ipump is equal to or less than the threshold value IM, determination of NO is made in S36. Subsequently, it is determined in S61 that "vent valve open stuck" occurs.

As described above, the malfunction diagnosis device 80 of the second embodiment diagnoses at least the malfunction of the pump 62 in the malfunction diagnosis based on the pump current Ipump in the state where the first vent valve 61 is closed, where the second vent valve 67 is opened, and where the pump 62 is turned on, or where the pump 62, which is turned on, is turned off. S33, S34, and S36 correspond to the malfunction diagnosis in the "state where the pump 62 is turned on", and S31 corresponds to the malfunction diagnosis in the "state where the pump 62, which is turned on, is turned off".

Further, the malfunction diagnosis device 80 of the second embodiment performs the malfunction diagnosis by combining determinations based on the pressure sensor output value Psns in the malfunction diagnosis. In this way, the malfunction diagnosis device 80 is capable of performing various types of malfunction diagnosis of the leakage diagnosis device 60. Therefore, the malfunction diagnosis device 80 is capable of appropriately discriminating between the leak of the evaporative fuel treatment device 10 and the malfunction of the leakage diagnosis device 60.

Third Embodiment

The malfunction diagnosis of the third embodiment will be described with reference to FIGS. 23 to 29. The malfunction diagnosis device 80 of the third embodiment performs the malfunction diagnosis based on the output value of the air-fuel ratio sensor 15 with the purge valve 42 that is opened to purge the evaporative fuel from the canister 23 to the intake passage 45 in the malfunction diagnosis. In the third embodiment, unlike the first and second embodiments, the leakage diagnosis of the system is not performed at the same time, and only the malfunction diagnosis of the leakage diagnosis device 60 is performed. Then, after it is confirmed that the leakage diagnosis device 60 has no malfunction, the leakage diagnosis of the system using the leakage diagnosis device 60 is performed again.

On the horizontal axis of the time chart of the third embodiment, $\tau 1$ to $\tau 5$ are used as time symbols to distinguish the time symbols from those in the first and second embodiments. The ellipse shown by the alternate long and short dash line in the drawing indicates a point of interest. Air-fuel ratio threshold values have a relationship of "$\lambda A > \lambda B > \lambda C > 14.7$ (ideal value)".

Figure 24:
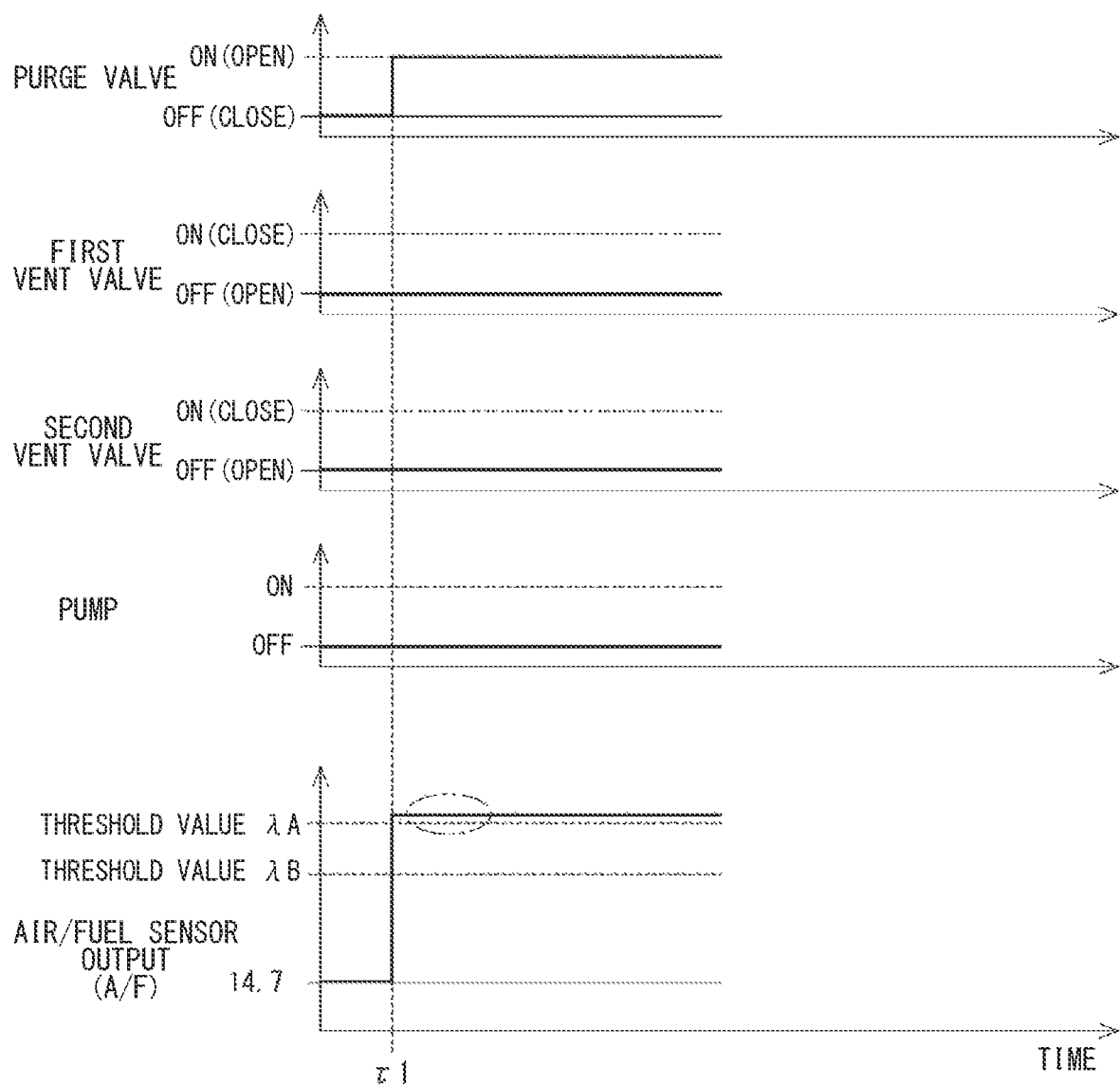
FIG. 24 is a time chart in a case of a filter clogging.

At time $\tau 1$, the purge valve 42 is opened in S41, and the purge is performed. When the passage from the atmospheric opening 33 to the purge valve 42 is capable of normally ventilating air therethrough, the evaporative fuel is introduced into the intake passage 45 when the purge is started, and the air-fuel ratio A/F of the air-fuel mixture becomes an ideal value of 14.7. When the passage is blocked, the evaporative fuel is hardly introduced into the intake passage 45. Therefore, the air-fuel mixture becomes lean, and the air-fuel ratio A/F becomes a value larger than the ideal value of 14.7. In S42, it is determined whether the air-fuel ratio sensor output value A/F is equal to or less than the threshold value $\lambda A$. As shown in FIG. 24, when the air-fuel ratio sensor output value NF is larger than the threshold value $\lambda A$, determination of NO is made in S42. Subsequently, it is determined in S641 that "filter A clogging" occurs.

Figure 25:
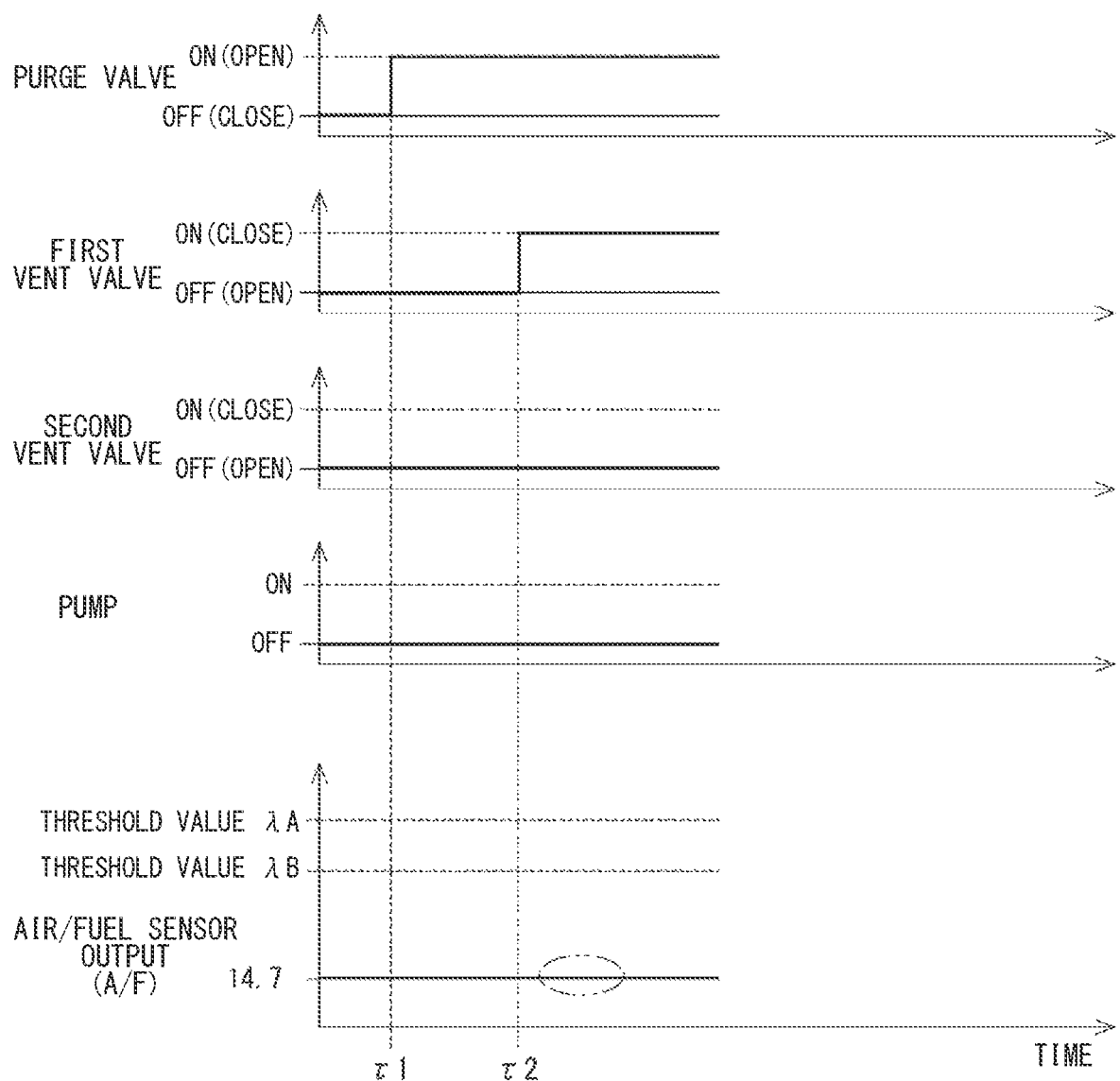
FIG. 25 is a time chart in a case of a first vent valve open seizure.

When determination of YES is made in S42, the first vent valve 61 is closed in S43 at time τ2. Subsequently, it is determined in S44 whether the air-fuel ratio sensor output value NF is larger than the threshold value AB. As shown in FIG. 25, when the air-fuel ratio sensor output value NF is equal to or less than the threshold value AB, determined of NO is made in S44. Subsequently, it is determined in S61 "first vent valve open stuck" occurs.

Figure 26:
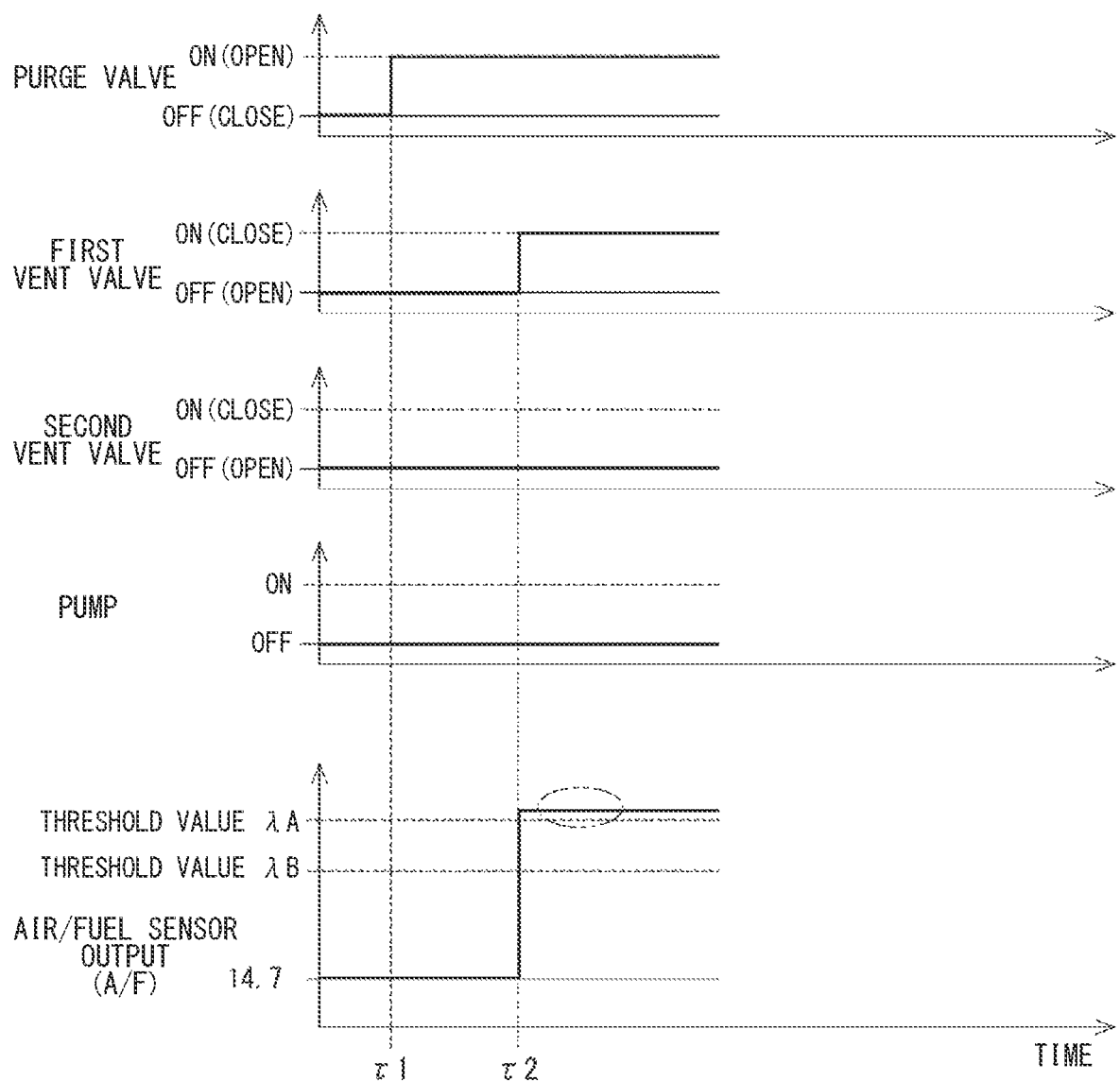
FIG. 26 is a time chart in a case of a filter clogging.

When determination of YES is made in S44, in S45, it is determined whether the air-fuel ratio sensor output value A/F is equal to or less than the threshold value λA. As shown in FIG. 26, when the air-fuel ratio sensor output value A/F is larger than the threshold value λA, determination of NO is made in S45. Subsequently, it is determined in S642 that "filter B or C clogging" occurs. That is, it is determined that at least one of the filter B 642 and the filter C 643 of the second atmospheric passage 32 is clogged.

Figure 27:
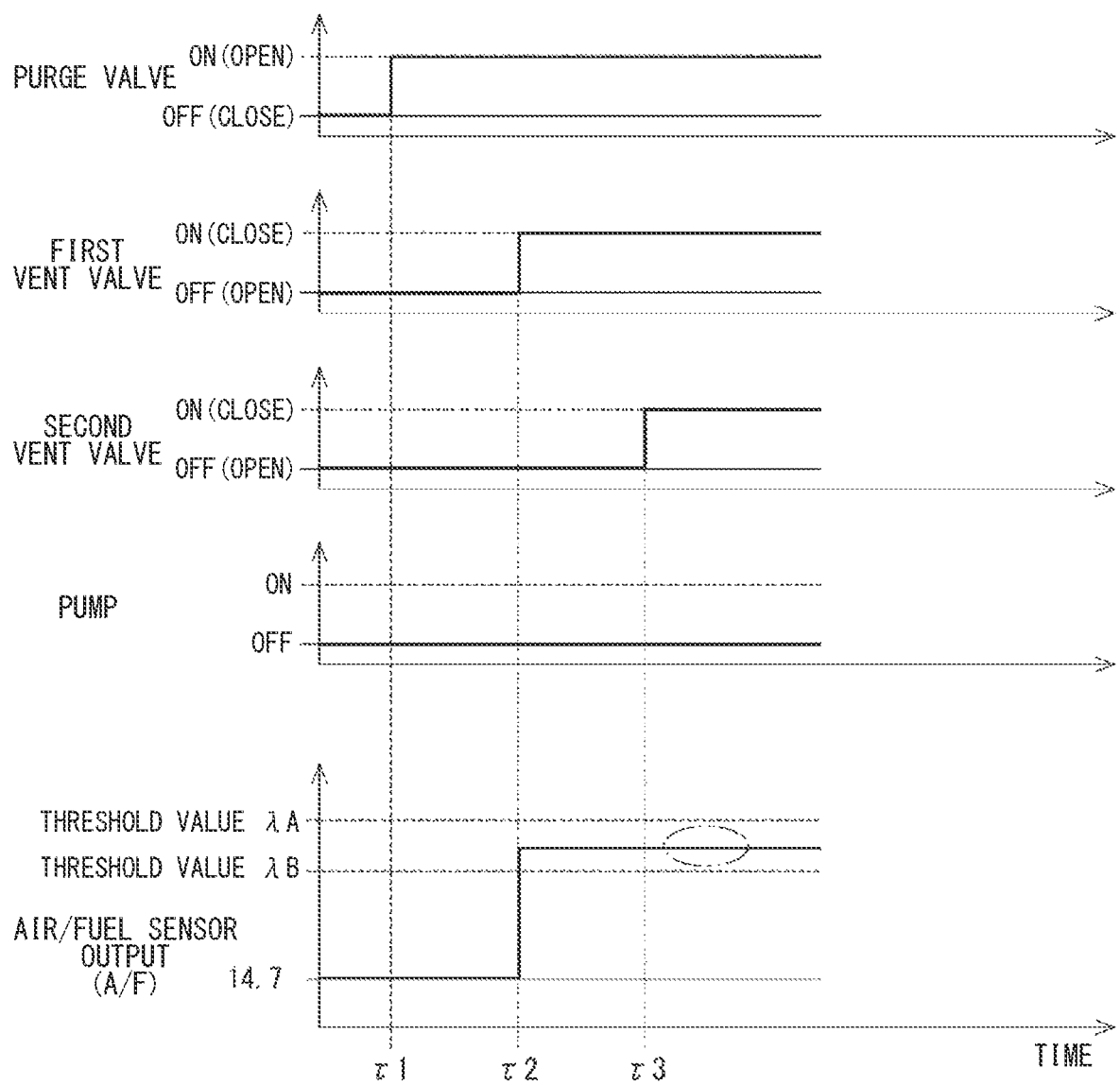
FIG. 27 is a time chart in a case of a second vent valve open seizure.

When determination of YES is made in S45, the second vent valve 67 is closed in S46 at time τ3. Subsequently, it is determined in S47 whether the air-fuel ratio sensor output value A/F is larger than the threshold value λA. As shown in FIG. 27, when the air-fuel ratio sensor output value A/F is equal to or less than the threshold value λA, determined of NO is made in S47. Subsequently, it is determined in S67 "second vent valve open stuck" occurs.

Figure 28:
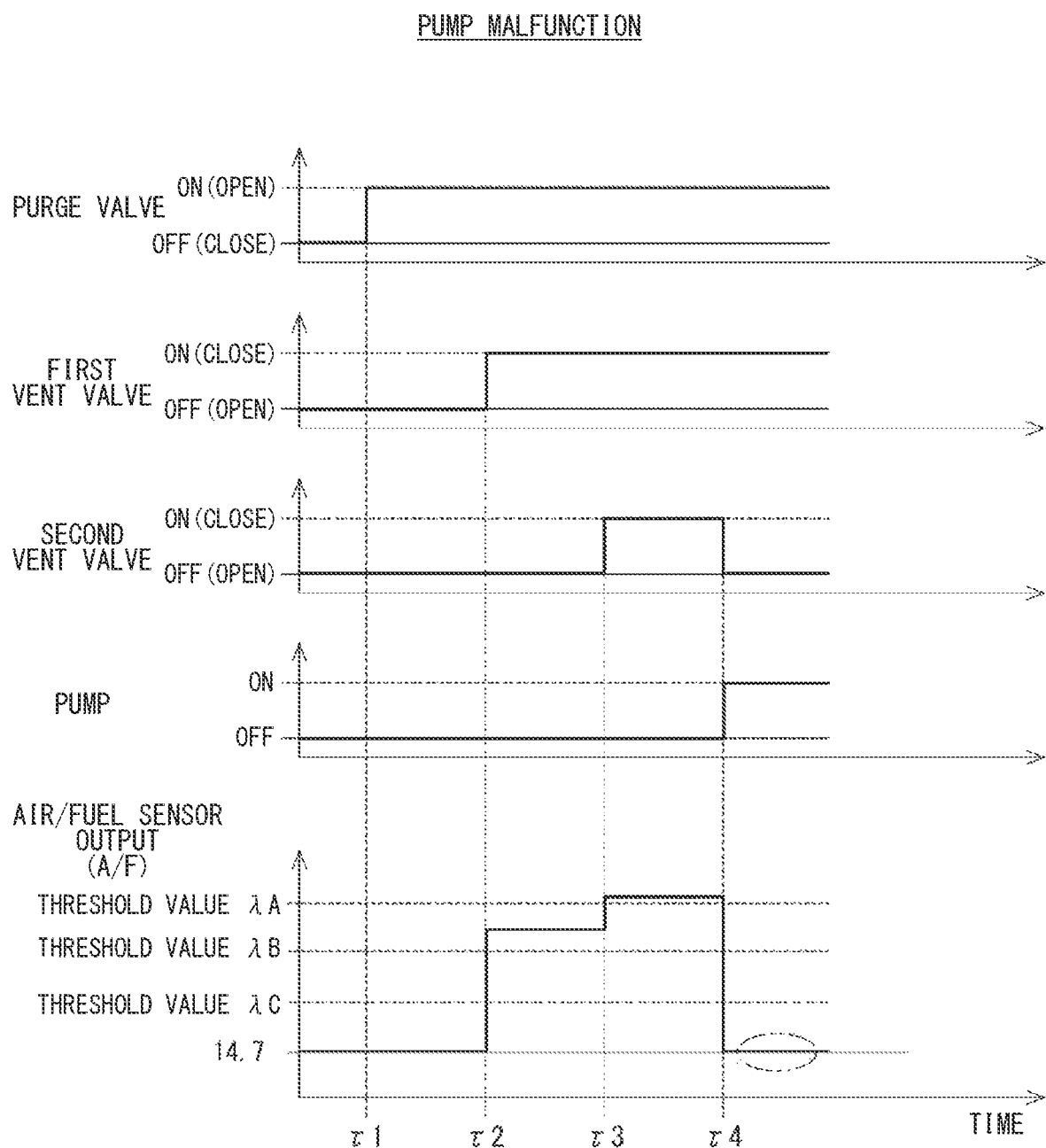
FIG. 28 is a time chart in a case of a pump malfunction.

When determination of YES is made in S47, the second vent valve 67 is opened in S48 at time τ4, and the pump 62 is turned on in S49. When the pump 62 is normal, the evaporative fuel is drawn toward the atmospheric opening 33, and introduction of the evaporative fuel into the intake passage 45 is avoided. Therefore, the air-fuel ratio A/F is supposed to increase. In S50, it is determined whether the air-fuel ratio sensor output value NF is larger than the threshold value λC. As shown in FIG. 28, when the air-fuel ratio sensor output value A/F is equal to or less than the threshold value λC, determination of NO is made in S50. Subsequently, it is determined in S62 that "pump malfunction" occurs.

Figure 29:
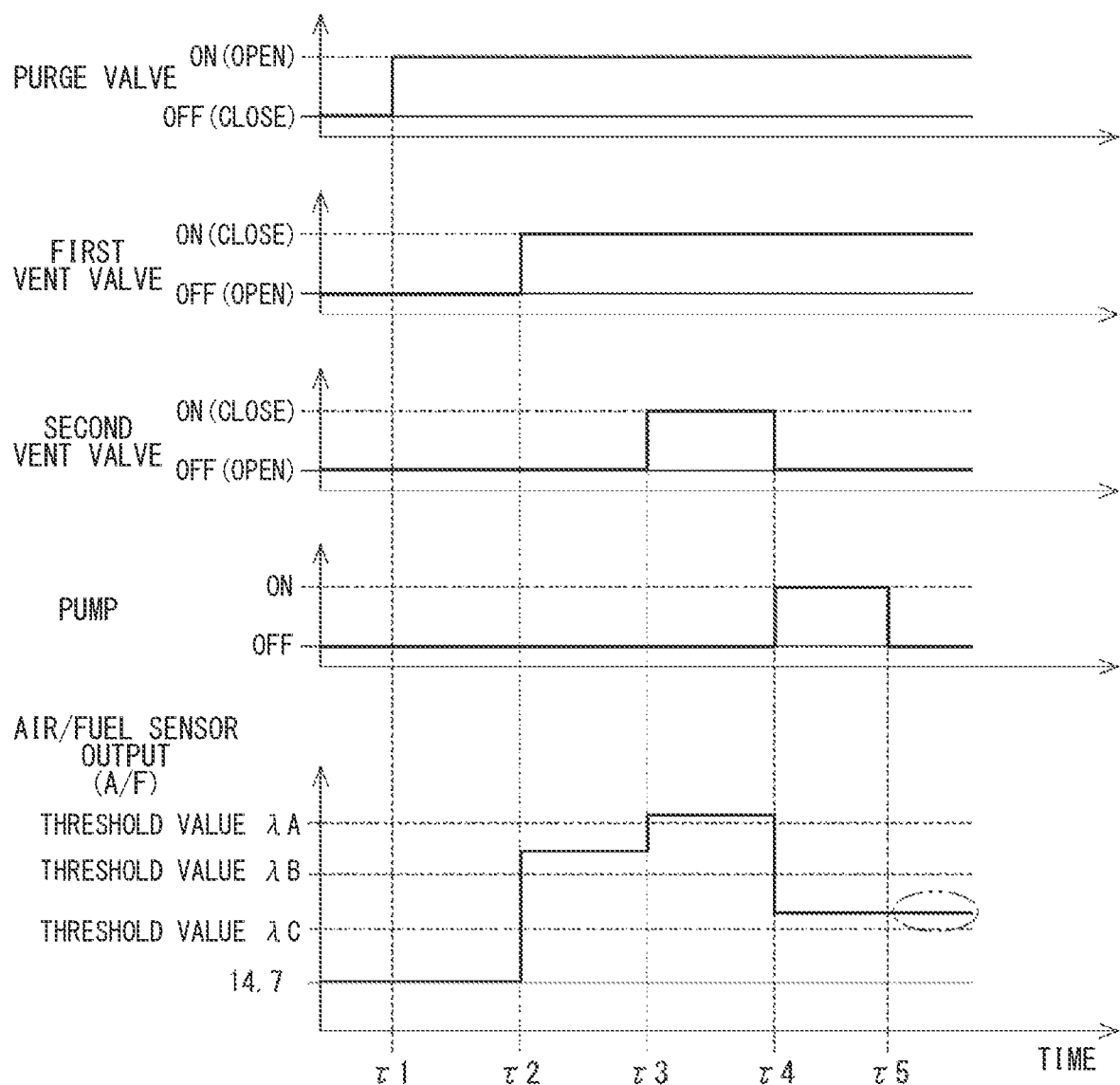
FIG. 29 is a time chart in a case of a pump off incapability.

When determination of YES is made in S50, the pump 62 is turned off in S51 at time τ5. When the pump 62 stops normally, the suction of the evaporative fuel is stopped, and the air-fuel ratio A/F is supposed to approach the ideal value. In S52, it is determined whether the air-fuel ratio sensor output value A/F is equal to or less than the threshold value λC. As shown in FIG. 29, when the air-fuel ratio sensor output value NF is larger than the threshold value λC, determination of NO is made in S52. Subsequently, it is determined in S66 that "pump off incapability" occurs.

In summary, the malfunction diagnosis of the third embodiment includes the step of evaluating the output value of the air-fuel ratio sensor in one or more of the following states (1) to (4). In this way, the malfunction diagnosis device 80 is capable of performing malfunction diagnosis of the leakage diagnosis device 60 based on the air-fuel ratio sensor output value A/F. Therefore, the malfunction diagnosis device 80 is capable of appropriately discriminating between the leak of the evaporative fuel treatment device 10 and the malfunction of the leakage diagnosis device 60.

(1) A state where the first vent valve 61 and the second vent valve 67 are opened and where the pump 62 is turned off. S42 corresponds to this state.

(2) A state where the first vent valve 61 and the second vent valve 67 are closed and where the pump 62 is turned off. S47 corresponds to this state.

(3) A state in which the first vent valve 61 is closed, the second vent valve 67 is opened, and the pump 62 is turned off. S44, S45, and S52 correspond to this state.

(4) A state in which the first vent valve 61 is closed, the second vent valve 67 is opened, and the pump 62 is turned on. S50 corresponds to this state.

Other Embodiments (a) As described above, the pump 62 of the leakage diagnosis device 60 may be a pressurization pump capable of pressurizing the second atmospheric passage 32 to the positive pressure side with respect to the atmospheric pressure during operation. In that case, the pressure sensor output value Psns in the first and second embodiments is basically reversed in magnitude with respect to the atmospheric pressure. Therefore, by using the absolute value of the pressure sensor output value Psns with the atmospheric pressure as the reference (that is, 0), it is possible to comprehensively represent the pressure changes caused by the decompression pump and the pressurization pump.

(b) The malfunction diagnosis in the first and second embodiments is not always performed with the purge valve 42 closed. If the system pressure can be detected, the malfunction diagnosis may be performed with the purge valve 42 opened.

(c) The pressure change "at time of temperature change" in S21 and S24 of the first embodiment is not limited to confirming the pressure increase when the temperature rises, and may confirm the pressure decrease when the temperature falls. In this case, in addition to forcedly cooling the system with a fan or the like, decrease in the system temperature after the engine is stopped may be used, and/or the system may wait for the temperature of the system to decrease as the temperature decrease in the night time.

(d) In the step of evaluating the change in the pressure sensor output value Psns from a certain operation, the method of comparing the time, which is for the pressure sensor output value Psns to reach the predetermined pressure threshold value, with the predetermined time threshold value corresponds to an evaluation based on an average rate. In addition, for example, the change may be evaluated based on an instantaneous rate calculated from a difference in the pressure sensor output value Psns in a minute time immediately after the operation.

(e) The order of steps in the flowchart of each of the above-described embodiments is an example. The order of steps may be changed as appropriate, as long as the malfunction diagnosis can be performed. Further, for example, in a case where it is known in advance that a certain element of the leakage diagnosis device 60 is normal, a part of step(s) may be omitted.

The present disclosure should not be limited to the embodiments described above, and various other embodiments may be implemented without departing from the scope of the present invention.

The present disclosure has been made in accordance with the embodiments. However, the present disclosure is not limited to such embodiments and configurations. The present disclosure also encompasses various modifications and variations within the scope of equivalents. Furthermore, various combination and formation, and other combination and formation including one, more than one or less than one element may be made in the present disclosure.

The controllers and methods described in the present disclosure may be implemented by a special purpose computer created by configuring a processor programmed to execute one or more particular functions embodied in computer programs. Alternatively, the apparatuses and methods described in the present disclosure may be implemented by special purpose hardware logic circuits. Further alternatively, the apparatuses and methods described in the present disclosure may be implemented by a combination of one or more special purpose computers created by configuring a processor executing computer programs and one or more hardware logic circuits. The computer programs may be stored, as instructions being executed by a computer, in a tangible non-transitory computer-readable medium.

What is claimed is:

1. A malfunction diagnosis device configured to perform malfunction diagnosis of a leakage diagnosis device, which is provided to an atmospheric passage, to diagnose leakage of evaporative fuel in an evaporative fuel treatment device, the evaporative fuel treatment device configured to purge evaporative fuel, which is adsorbed on a canister, to an intake passage through a purge passage, the canister being connected to a fuel tank through a vapor passage and connected to an atmospheric opening through the atmospheric passage, the leakage diagnosis device including
   a first vent valve configured to block a first atmospheric passage, which is a main passage of the atmospheric passage and connects the canister with the atmospheric opening,
   a second vent valve configured to block a second atmospheric passage, which is a bypass passage of the first atmospheric passage and connects the canister with the atmospheric opening, and
   a pump provided on a side of the atmospheric opening relative to the second vent valve in the second atmospheric passage, and being configured to pressurize or depressurize the second atmospheric passage, and the malfunction diagnosis device including a processor configured to perform the malfunction diagnosis based on an output value of a pressure sensor that is configured to detect pressure in a passage connected to the canister.

2. The malfunction diagnosis device for the leakage diagnosis device according to claim 1, wherein
the processor is configured to, in the malfunction diagnosis, evaluate an output value of the pressure sensor with the first vent valve closed, the second vent valve opened, and the pump turned on.

3. The malfunction diagnosis device for the leakage diagnosis device according to claim 2, wherein
the processor is configured to, in the malfunction diagnosis, evaluate a change in the output value of the pressure sensor immediately after the second vent valve is closed from an opened state.

4. The malfunction diagnosis device for the leakage diagnosis device according to claim 2, wherein
the processor is configured to, in the malfunction diagnosis, evaluate a change in the output value of the pressure sensor immediately after the pump, which is turned off, is turned on with the first vent valve closed, and the second vent valve opened.

5. The malfunction diagnosis device for the leakage diagnosis device according to claim 2, wherein
the processor is configured to, in the malfunction diagnosis, evaluate the output value of the pressure sensor, when an ambient temperature of the leakage diagnosis device changes with the first vent valve closed, the second vent valve opened, and the pump turned on.

* * * * *